United States Patent [19]

Wunluck et al.

[11] 3,909,542

[45] Sept. 30, 1975

[54] TRUNK CIRCUIT CONTROL ARRANGEMENT FOR A COMMUNICATION SWITCHING SYSTEM

[75] Inventors: Bruce R. Wunluck, Oak Lawn; Johannes Draayer, Wheaton; John S. Young, Addison, all of Ill.; John G. Van Bosse, Acton, Mass.; Robert P. Douglas, Elmhurst, Ill.

[73] Assignee: GTE Automatic Electric Laboratories Incorporated, Northlake, Ill.

[22] Filed: Sept. 14, 1973

[21] Appl. No.: 397,545

[52] U.S. Cl. .......................... 179/18 AH; 179/18 ES
[51] Int. Cl.[2] .......................... H04Q 3/54
[58] Field of Search .......................... 179/18 AH

[56] References Cited

UNITED STATES PATENTS 3,806,887 4/1974 Schulte et al. .............. 179/18 ES X

*Primary Examiner*—William C. Cooper
*Attorney, Agent, or Firm*—John T. Winburn

[57] ABSTRACT

A trunk circuit control arrangement for a communication switching system having a common control unit includes duplicate trunk control highway circuits controlled by the common control unit for each of a plurality of trunk circuits to provide control signals for enabling control relays of the trunk circuits of each group to be selectively energized to establish different control states for the trunk circuits. Each trunk circuit includes a select relay the operation of which is controlled by the common control unit to permit the control relays of a selected trunk circuit to be connected to the corresponding trunk control highway for operation. The trunk control highway circuits include transfer relays operable to normally set a first trunk control highway for each trunk circuit group to an active state and the second trunk control highway to a standby state and test relays which monitor the operation of the trunk control highways and effect transfer, via the common control unit from the active trunk control highway to the standby trunk control highway in the event of a fault in the active trunk control highway.

10 Claims, 42 Drawing Figures

CONTROL MATRIX LAYOUT

4 WIRE ACCESS TRUNK CIRCUIT

STATE $\bar{C} \cdot \bar{D}$

STATE $C \cdot \bar{D}$

4 WIRE DELAYED CALL TRUNK CIRCUIT

OPERATOR SERVICE TRUNK CIRCUIT

OPERATOR SERVICE TRUNK CIRCUIT

TRUNK CIRCUIT CONTROL ARRANGEMENT FOR A COMMUNICATION SWITCHING SYSTEM

BACKGROUND OF THE INVENTION

1. Field of the Invention

This invention relates to communication switching systems employing common control, and/or particularly, to a trunk circuit control arrangement for use in such systems.

2. Description of the Prior Art

Communication switching systems, such as telephone switching systems, generally include traffic offices which provide operator assistance for various customer services, such as person-to-person, station-to-station, or collect calls, and the like, billing functions, and call routing procedures. To provide all operator services more efficiently and more economically than is possible with present methods, electronic, stored program control systems have been developed to serve all traffic requiring operator assistance. One such system, referred to as a traffic service position system (TSPS) is described by Bell Laboratories in a series of articles, entitiled "TSPS No. 1" in Bell System Technical Journal Vol. 49, No. 19, December 1970, pages 2417–2731.

The system employs trunk circuits which serve as an interface between the TSPS system and subscribers connected to the system via end office enabling the system to monitor and control call states and to split and bridge signalling and transmission paths as is required to perform various functions, such as connections to an operator position or to a multifrequency sender or receiver, for example.

The trunk circuits include a plurality of control relays which establish control states for the trunk circuits. In the stored program common control system referred to above, the various control relays of each trunk circuit are controlled by common control apparatus which includes a central processing unit which provides commands for selectively enabling control relays of the various trunk circuits. The common control includes a control matrix which serves as an interface between the central processing unit and the trunk circuits. The control matrix includes a separate control bit for each trunk control relay. The central processor unit accesses the control matrix on a row or column basis to write bits true to effect energization of a control relay which corresponds to the bit position being accessed. However, in the event of a fault in a bit position, in a row or column of the control matrix, the trunk circuits having control relays with bits in such row or column would be disabled. Accordingly, the entire control matrix is generally duplicated to minimize the "down time" should a fault occur in the control matrix.

Accordingly, it would be desirable to provide a trunk control arrangement in a common control switching system which provides reliability of operation without the need for duplicating the entire control matrix. It would further be desirable to minimize the number of control points required for a given number of trunk circuits while providing fast and reliable switching functions for the trunk circuits to provide the desired operations.

SUMMARY OF THE INVENTION

It is an object of the present invention to provide an improved trunk control arrangement for a communication switching system.

It is another object of the invention to provide a trunk control arrangement for a communication switching system employing common control which minimizes the number of control points required for selective operation of a given number of trunk circuits.

Another object of the invention is to provide a trunk control arrangement which enables selective energization of control relays of a plurality of groups of trunk circuits over duplicated trunk control highways.

In accordance with the present invention, there is provided a trunk circuit control arrangement for use in a communication switching system for selectively configuring a plurality of trunk circuits to various control states to provide various modes of operation for the trunk circuits. The trunk circuit control arrangement provided by the present invention affords selective control of trunk circuits over duplicated trunk control highways. The trunk circuits are grouped into a plurality of trunk groups, each having an associated trunk control highway which enables command signals to be extended to the trunk circuits for establishing the control states for the trunk circuits. Each trunk circuit further includes means selectively enabled to connect the associated trunk circuit to the corresponding trunk control highway. Through the use of selective connection of a trunk circuit of a given trunk group to a trunk highway control common to such group of trunk circuits, the amount of equipment required to effect configuration of a given group of trunk circuits is minimized.

In accordance with a preferred embodiment of the invention which is employed in a common control switching system, the command signals for the trunk circuits are extended from a common control apparatus over a control matrix. The control matrix comprises a plurality of multi-bit words, a separate word corresponding to each trunk group. A first group of bits of each word control the selection of a given trunk circuit within a trunk group. Second and third groups of bits of the word enable commands to be extended over first and second trunk control highways, respectively to enable configuration of a trunk circuit connected to the trunk control highway. One of the trunk highways is operable in an active mode and the other trunk highway is operable in a standby mode.

In accordance with the invention, each trunk group has an associated trunk highway group test means which is operable to detect fault conditions for the control bits of the active trunk highway. The trunk highway group test means extends an indication of any fault condition in the active trunk control highway to the common control. The common control responsively effects the transfer from the active highway to the standby highway.

The trunk control circuit of the present invention further includes switching means which is controlled by the common control to effect the transfer from the active highway to the standby highway in the event of a fault condition. The highway transfer function is effective for all of the trunk groups in the event of a fault detection for any one or more of the trunk groups.

CROSS-REFERENCES TO RELATED APPLICATIONS AND PUBLICATIONS

The system in which the present invention is incorporated in disclosed in an article entitled IMPROVED EFFICIENCY IN TOLL HANDLING WITH TSPS (TRAFFIC SERVICE POSITION SYSTEM) by W. D. Wilson in "Automatic Electric Technical Journal", Vol. 12, No. 7, dated July, 1971. The common control equipment for the system in which the arrangement of the present invention is incorporated is disclosed in U.S. Pat. No. 3,818,455 entitled CONTROL COMPLEX FOR TSPS TELEPHONE SYSTEM by E. F. Brenski et al., Chang et al., "Timing Monitor Circuit for Central Data Processor of Digital Communications System", U.S. Pat. No 3,810,121 Schulte et al., "Maintenance Access Circuit for Central Processor of Digital Communication System", U.S. Pat. No. 3,806,887; Wilber et al., "System for Reconfiguring Central Processor and Instruction Storage Combinations", U.S. Pat. No. 3,828,321; Buhrke et al., "Timing Monitor Circuit for Central Data Processor of Digital Communication System", Ser. No. 393,543 filed Aug. 31, 1973; Schulte et al., "Program Timing Circuitry for Central Data Processor of Digital Communication System", Ser. No. 393,542, filed Aug. 31, 1973; Mele et al., "Configuration Control Circuit for Control and Maintenance Complex of Digital Communication System", Ser. No. 397,452, filed Sept. 14, 1973; Wilber et al., "Malfunction Monitor Circuit for Central Data Processor of Digital Communication System", Ser. no. 397,567, filed Sept. 14, 1973; Rice et al., "Interrupt Control Circuit for Central Data Processor of Digital Communication System", U.S. Pat. No. 3,838,223. The network audio path test arrangement is disclosed in U.S. patent application, Ser. No. 397,549, filed concurrently with the present application, entitled METHOD AND APPARATUS FOR TESTING NETWORK CROSSPOINT PATHS, by J. G. Van Bosse et al., hereinafter referred to as the AUDIO TEST application. The network control arrangement is disclosed in U.S. patent application, Ser. No. 397,453, filed concurrently with the present application, and entitled COMMUNICATION SWITCHING SYSTEM NETWORK CONTROL ARRANGEMENT, by G. R. Athas et al., hereinafter referred to as the NETWORK CONTROL application. The peripheral control unit is disclosed in the U.S. Patent application Ser. No. 397,456, filed concurrently with the present application, entitled PERIPHERAL CONTROL UNIT FOR A COMMUNICATION SWITCHING SYSTEM by E. F. Brenski et al., hereinafter referred to as the PERIPHERAL CONTROL APPLICATION.

DESCRIPTION OF THE DRAWINGS

FIGS. 14*a*–14*e* show way forms illustrating the operation of control relays of a typical trunk circuit;

DESCRIPTION OF A PREFERRED EMBODIMENT

General Description

Figure 1:
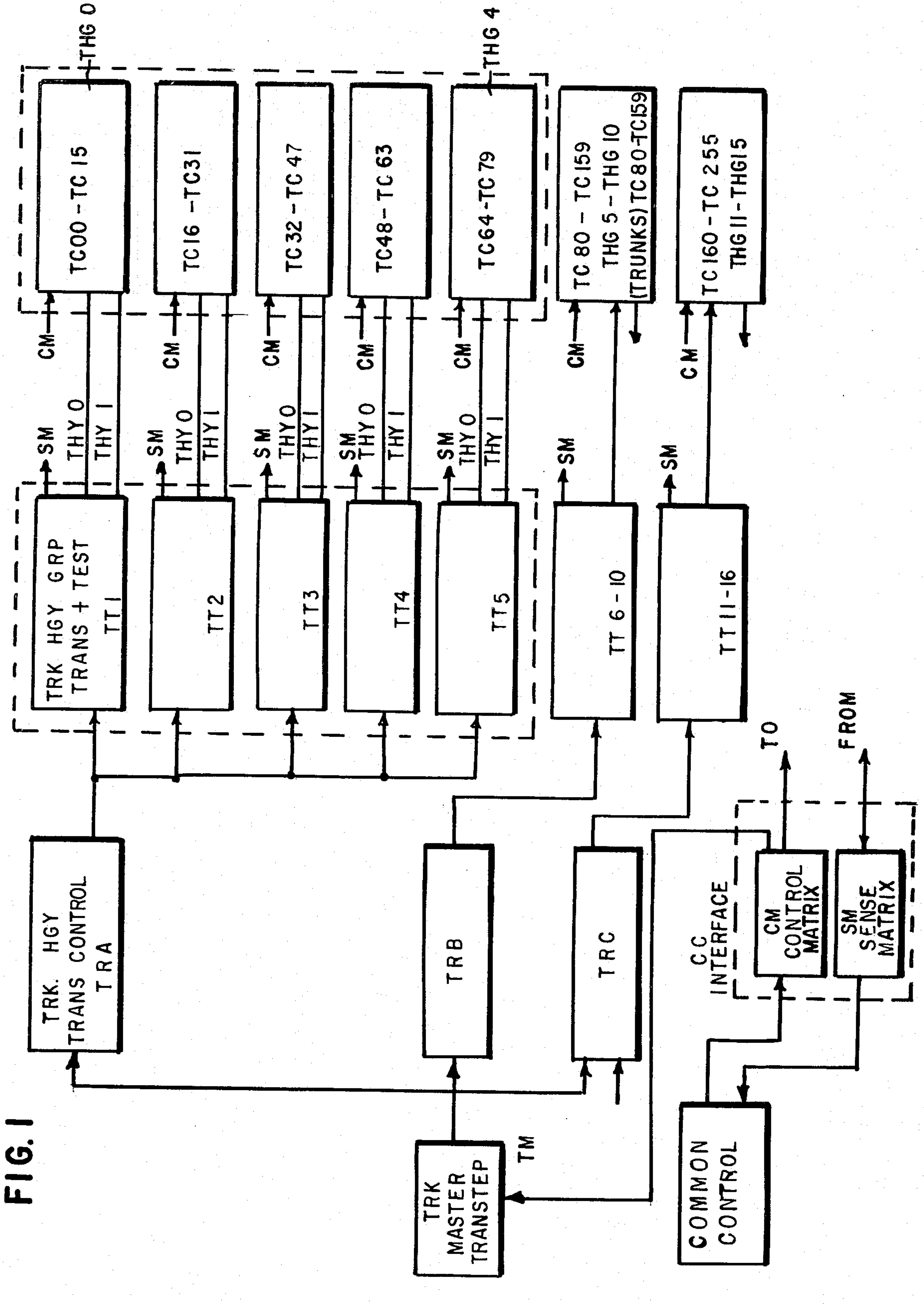
FIG. 1 is a block diagram of the trunk control arrangement provided by the present invention.

Referring to FIG. 1, there is shown a block diagram of a trunk circuit control arrangement provided by the present invention which is adapted for use in a common control communication switching system. In an exemplary embodiment wherein 256 trunk circuits are employed, the trunk circuit control includes a trunk master transfer control circuit TM, trunk highway transfer control circuits TRA–TRC, and trunk highway group transfer and test circuits TT1–TT16.

The trunk circuits TCOO–TC255 are grouped into 16 trunk highway groups THGO–THG15. Each trunk highway group, such as trunk highway group THYG1, includes 16 trunk circuits TC00–TC15. Each trunk highway group has an associated trunk highway group transfer and test circuit, such as transfer and test circuit TT1 for trunk highway group THGO, which extends control signals provided by a common control apparatus CC over a common control interface CCI to the trunk highway group THG1 over duplicated trunk highways THY0 and THY1. The common control interface includes a control matrix CM and a sense matrix SM which are described in detail in the PERIPHERAL CONTROLLER application referenced above. The common control apparatus is described in the COMMON CONTROL application referenced above.

As will be described in more detail hereinafter, each trunk circuit includes up to five control relays which enable configuration of the trunk circuits for various operating modes as will be shown hereinafter. The control relays are selectively energizable by control signals extended to the trunk circuit from the common control over the corresponding trunk highway group transfer and test circuit. In addition, each trunk circuit includes a select relay energizable by a control signal supplied to the trunk circuit directly from the common control over the interface CCI. The select relay of a given trunk circuit when operated effects connection of the control relays associated with such trunk circuit to one of the trunk highways to receive the control signals extended to the trunk highway over the trunk highway group transfer and test circuit.

The control matrix provides control outputs for enabling relays of the trunk circuits TCOO–TC255 and also the master trunk transfer circuit. The control matrix CM is basically a word oriented memory providing a separate control word for each trunk group wherein a first group of bits of the memory word provide control outputs for the select relays of the corresponding trunk group on a one-for-one basis, and second and third groups of bits of the memory word provide control outputs over the trunk highways THY0 and THY1, respectively. A given trunk circuit of a trunk group is selected by writing a true bit in a corresponding bit position of the control matrix word for the trunk group, and the trunk circuit control relays are selectively enabled to configure the trunk circuit to provide a desired operation by writing true bits into bit positions of the control matrix which correspond to trunk highway positions to which the control relays are connected by the select relay.

The sense matrix SM enables the states of sense points of the trunk circuits and the trunk control circuits to be extended to the common control.

As noted above, each trunk highway transfer and test circuit, such as transfer and test circuit TT1 provides duplicated trunk highways THY0 and THY1 to enable control signals from the common control to be extended to the corresponding trunk highway group THGO–THG15. One of the trunk highways, such as trunk highway THY1 is normally the active highway and the other trunk highway THY0 is the standby highway.

The trunk highways are duplicated so that in the event of a column fault in the control matrix CM, the control function can be switched from the active trunk highway to the standby trunk highway so that the fault does not cripple all 256 trunk circuits.

Fault sense points of the trunk highway transfer and test circuits TT1–TT16, extended to the common control CC via the sense matrix SM enable monitoring of the trunk highways. In the event of a fault, the trunk highway transfer and test circuits TT1–TT16 under the control of the common control effect the transfer of all sixteen trunk groups THG0–THG15 from the active trunk highway THY1 to the standby trunk highway THY0. Such transfer is effected by the trunk master transfer circuit MT and the trunk highway transfer control circuits TRA–TRC is responsive to a command from the common control CC.

General System Description

Figure 2:
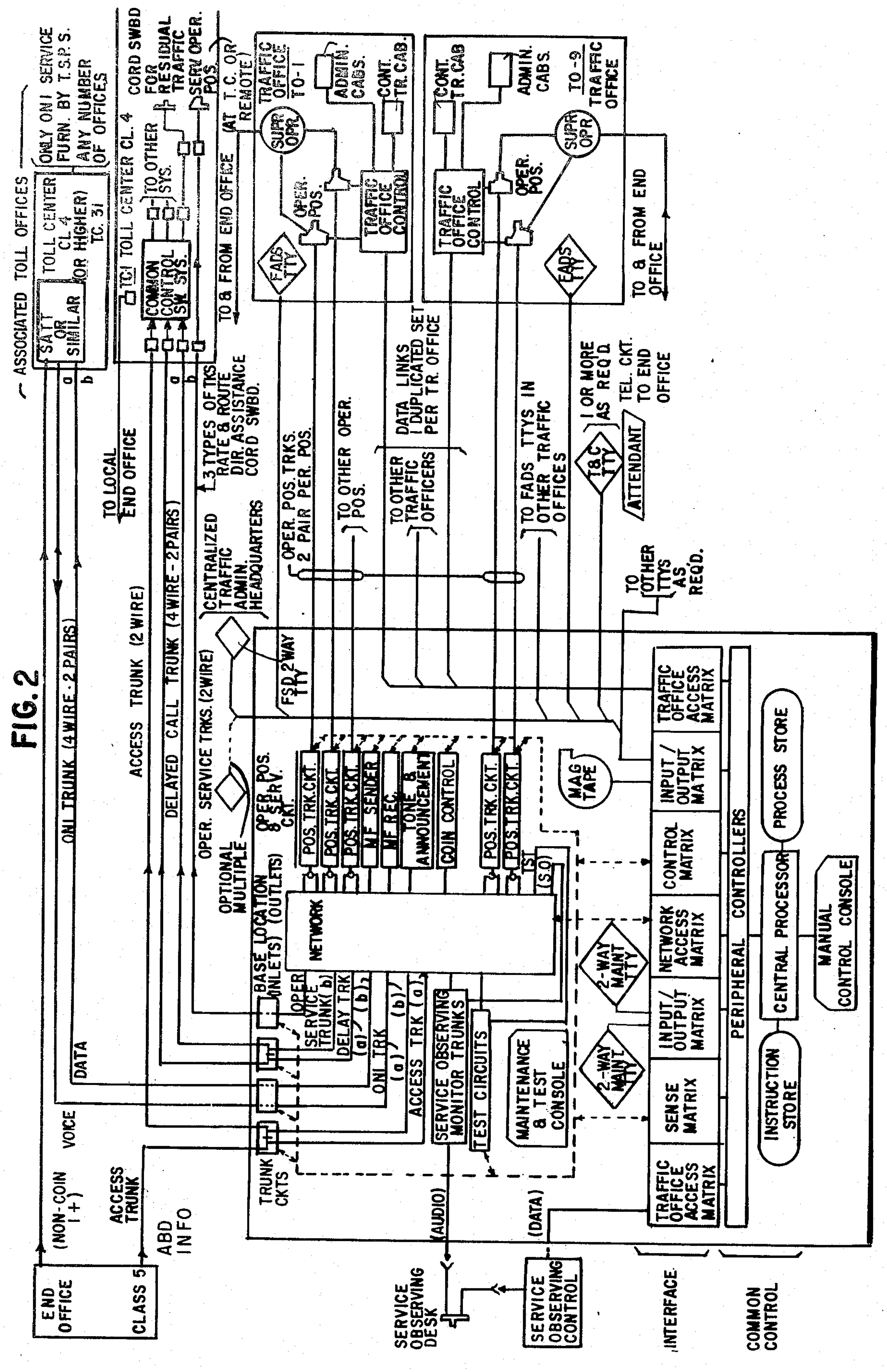
FIG. 2 is a block diagram of a common control communication switching system in which the present invention is incorporated.

Referring now to FIG. 2, the system in which the present invention is incorporated is a traffic service position system (TSPS), which permits and induces more customer dialing of toll calls and automates the processing of those calls as far as is feasible. The TSPS system is adapted to provide operator assistance and other services for class 5 end offices attempting calls to associated toll offices. Expanded Direct Distance Dialing (EDDD) permits dialing of nearly all toll calls not presently handled by DDD. The TSPS system generally comprises a single base location and a group of traffic offices TO-1 through TO-9 which are distributed in advantageous locations and which may or may not be located remotely relative to the base location. The base location generally comprises a group of trunk circuits connectable between end office and toll offices under the control (broken lines) of a stored-program common control via an interface, and a network arrangement for interconnecting the access trunk circuits with a group of position trunk circuits connected to operator positions of the traffic offices and with a group of service circuits serving as multi-frequency senders, multi-frequency receivers, tone and announcement circuits and coin control circuits. As shown in the drawings, the common control interface includes various different sense and control point matrix circuits for sensing different signals in the system and for temporarily storing information. Teletypewriters are provided for maintenance purposes and for time and charges information. The common control is disclosed in said COMMON CONTROL patent application. The base location further includes test circuits operative under the control of a maintenance and test console, and service observing monitor trunks under the control of a service observing desk which has an audio connection to the service observing monitor trunks and has a data link to the traffic office access matrix via a service observing control circuit for testing the network.

The traffic offices each include operator position consoles connected to a traffic office control arrangement, and connected to a supervisory operator position, which are coupled to the end offices. The traffic control arrangement is also connected to administrative and controlled traffic cabinets. A force administration and traffic engineering data system including a teletypewriter is connected to the input/output matrix of the interface arrangement. The trunk circuits are relay circuits for providing the TSPS system with an information and control point on the trunk between the class 5 office and the class 4 office. A delay call trunk is available to operators with two legs or conductors into the class 4 office. An ONI (Operator Number Identification) trunk provides a link with other systems such as a Strowger Automatic Toll Ticketting System SATT, for the purpose of allowing the TSPS system operator to secure and enter the calling number in those systems. The stored program control central processor unit CPU of the system utilizes an instruction store memory sub-system associated with the CPU in which is stored "permanent" information, such as call processing instructions, translation data, and diagnositc routines. A process store memory sub-system associated with the CPU stores temporary information accumulated during call processing. The peripheral controller allows the CPU to communicate with the matrices, such as the network access matrix so that the CPU obtains current information about the system and conveys information thereto.

The traffic office is a complex which includes up to 62 operator positions, arrangements for administrative, supervisory and training functions, and control equipment for these units. The positions in a TSPS may be grouped into as many as nine traffic offices, each of which may be located at a different site within 50 miles of the base installation. The service circuits may be temporarily associated with trunks in order to provide specific functions. Included in this category are receivers, for obtaining called and calling numbers, senders, for extending calls into the toll office, and tone and announcement circuits for passing audio information to the trunk. Service circuits operate under control of the unit CPU.

The network is an array of crosspoint device reed relays arranged to permit the temporary association of trunks with positions and service circuits.

A magnetic tape sub-system provides an output of system data for further processing off-line. Principal data are call records, provided for purposes of customer billing. The time and charges reporting equipment provides customers with an immediate report of the elapsed time and the charges incurred on specific toll calls.

The Force Administration and Traffic Engineering Data System FADS provides information on a timely basis for administering the Traffic Offices, and information for off-line processing pertinent to equipment engineering.

Via access trunks from local offices, customers may dial their own person, collect, notify, credit card and bill to third number calls from noncoin and coin telephones.

The connection to the called number is set up when the operator is bridged onto the call, thus improving the speed of service. Normally, by the time the operator has determined how assistance may be given the calling customer, the called telephone will have answered. The operator then only need determine that the proper person is reached, or that a collect call is accepted. If the call is to be billed to a third number or is a credit card call, the operator records the billing numbers by keying them into the system thus avoiding the need for preparing a ticket.

These same types of calls may also be made from coin telephones, as well as station sent paid calls.

The operatior receives visual displays, in most cases, of the amount of money due and supervises its collection. Once conversation starts, the operator is released form the connection. Notification of the end of the initial period and collection of overtime charges are made by any operator who is available when it is time to perform these functions. The equipment associated with the TSP system does all the remembering and calculating required.

The adavantages of automated handling may be extended to those calls in which the customer only dials 0, and waits for an operator to answer. In most cases, the operator is able to key the desired called number into the machine, and can be relieved of the task of timing and ticketing the call.

In these ways, operator work time per call is reduced, permitting fewer operators and positions to handle a given volume of traffic.

The system is arranged for up to 310 positions to function as a single team, with calls distributed on a rotational basis to staffed positions. The large team permits efficient staffing over a wide range of offered call volume, including late night. However, the positions are physically arranged in groups of not more than 62 each. These groups may be located remotely from the base unit and from each other permitting advantageous selection of working conditions and labor markets.

The system encompasses the ability to serve many call types and may be associated with different kinds of connecting offices. The following is a brief description of a particular call in order to illustrate some of the techniques of call processing.

Calls entering the TSPS system via the access trunks are broadly categorized in accordance with the characteristics of the calling station (usually coin, non-coin, hotel) and by the apparent intentions of the caller as evidenced by the manner in which the call was placed (1+, 0+, or 0−). A call from a coin station is assumed in which the user dials 0, followed by a 7 or 10 digit number which is repeated by dial pulse to the TSPS system.

Each access trunk is associated with input detector points that exhibit the on-hook or off-hook status from the local (class 5) office, and from the toll office. The latter is of significance only on active calls. These points are repetitively scanned at short intervals by the CPU, and on each scan, the "present" state is compared with the state at the "last look", which is a record maintained in the process store. When a particular trunk is seized by the end office, in response to the 0 dialed by the customer, the mismatch of the present state with the last look defines the origination to the CPU. By consulting stored information associated with that trunk, a determination is made that the called number will be transmitted by dial pulse. For this case, the scan is provided at intervals short enough to ensure that each new state is observed at least once; thus, the succession of on-hook, off-hook transitions that constitute a dial pulse train are detected, counted and recorded in the process store. Inter-digital pauses are noted by timing. When the total number of digits received constitutes the address of a valid destination, the calling number is needed. Assuming that the originating office can furnish this via automatic number identification (ANI), the CPU selects an idle MF receiver and instructs the network control to set a path between the trunk and that receiver. When this has been accomplished, an output generator point associated with the trunk is set, which causes off-hook to be returned to the local office as a signal to transmit the calling number via MF. This is received and transferred, one digit at a time, to the process store. After the calling number is complete, the network control is instructed to take down the connection to the MF receiver.

Since a coin call placed on an 0+ basis is assumed and the originating and terminating points are now known, memory is then checked to determine if this call can be automatically rated. Assuming this is the case, the charges for the initial period, including tax are calculated at the person rate.

The call is next assigned to an available position and the appropriate network connection is established by the network control as directed by the CPU. Simultaneously, data in the process store is transmitted to the control complex at the required traffic office, causing specific lamp signals to be activated at the selected TSP. For the assumed case, these lamps include a digital display of the calculated charges and time of the initial period, and a "class of call" lamp designated COIN, 0+. The call appears on one of the three loops on the position, which is also indicated by a lamp signal. The operator is alerted by an order tone of the receipt of a call, following which the voice path to the subscriber is automatically completed.

After the position is connected to the trunk through the network, a second network connection is automatically established between the trunk and an idle sender.

The trunk provides for two simultaneous network connections, one to the "local" side and the other to the "toll" side.

The sender immediately begins to outpulse under control of the CPU. Depending upon the requirements of the toll office, the signalling mode may be DP or MF, or a combination thereof. The call is, therefore, being advanced toward its destination while the operator is determining how assistance may be given this call. If the call is person sent paid, as inferred from the manner in which it was placed, the operator supervises the collection of coins and verifies that the desired party has been reached.

If, however, the customer wishes to use a credit number on a person basis, the proper type of billing indication is keyed, which is registered in the process store and which causes the display to be cleared. The 10 digit credit card number is obtained and keyed into the process store. These operations may overlap the return of ring-back tone from the called office, since the sender has been functioning independently of the operator's keying actions. When the desired party is obtained, the operator authorizes the start of timing and retires from the call.

The call is now "floating", supervised only by the CPU. All call data is in the process store and time is being accumulated; no timing or ticket writing functions have been performed by the operator.

When on-hook is detected from the calling party, time accumulation is suspended and 2.2 second timeout is initiated, if the on-hook persists after the timeout, the call is considered terminated. Call data is passed from the process store to the tabulator system to be recorded for off-line processing. Output generator points associated with the trunk are reset by the CPU to cause on-hook to be indicated to both the local and toll offices, which in turn releases all switched connections. The trunk is now available for another call.

If an off-hook condition is again detected from the originating subscriber during the 2.2 second timeout for disconnect, a flash recall is recognized and the call is again assigned to a position. This is (probably) not the position that was assigned originally; however, any call details needed by the new operator are brought up automatically or are available upon request via the digit display.

If special circumstances warrant, the operator may hold a call and prepare a manual ticket. In other special circumstances, the TSPS operator may pass a call to cord board for manual handling.

If the call in the above example had been placed from a non-coin station, the operations would be similar except that no charge would be computed prior to the initial entry, and the class of call lamp would indicate NON-COIN, 0+.

Description of Trunk Circuits

The system shown in FIG. 2 may include various types of trunk circuits including access trunk circuits, delayed call trunk circuits, operator service trunk circuits and operator number identification (ONI) trunk circuits.

Access Trunk Circuits

Figure 3:
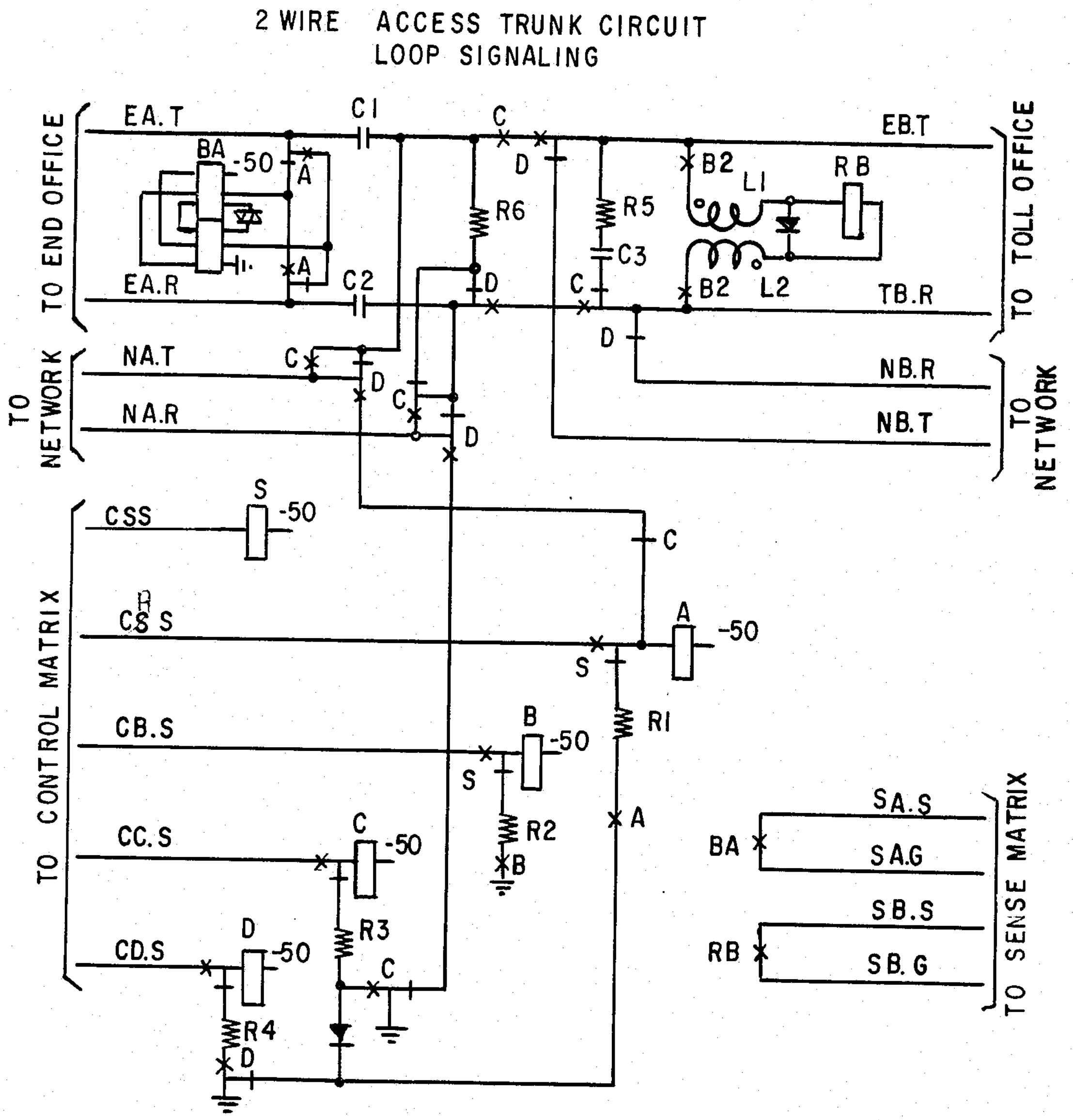
FIG. 3 is a schematic circuit diagram for a two-wire access trunk circuit.
Figure 4:
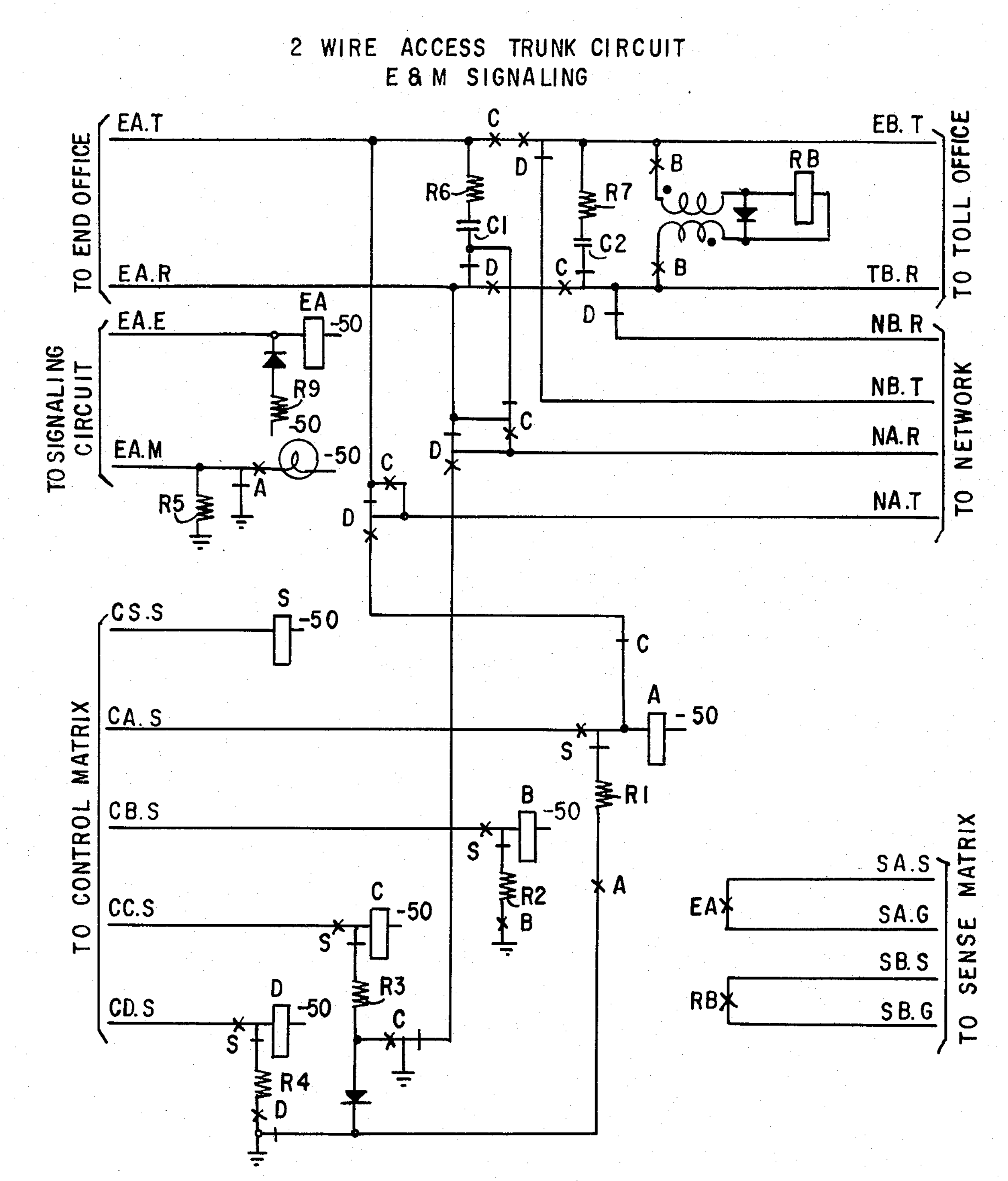
FIG. 4 is a schematic circuit diagram for a two-wire access trunk circuit employing E and M signalling.
Figure 6:
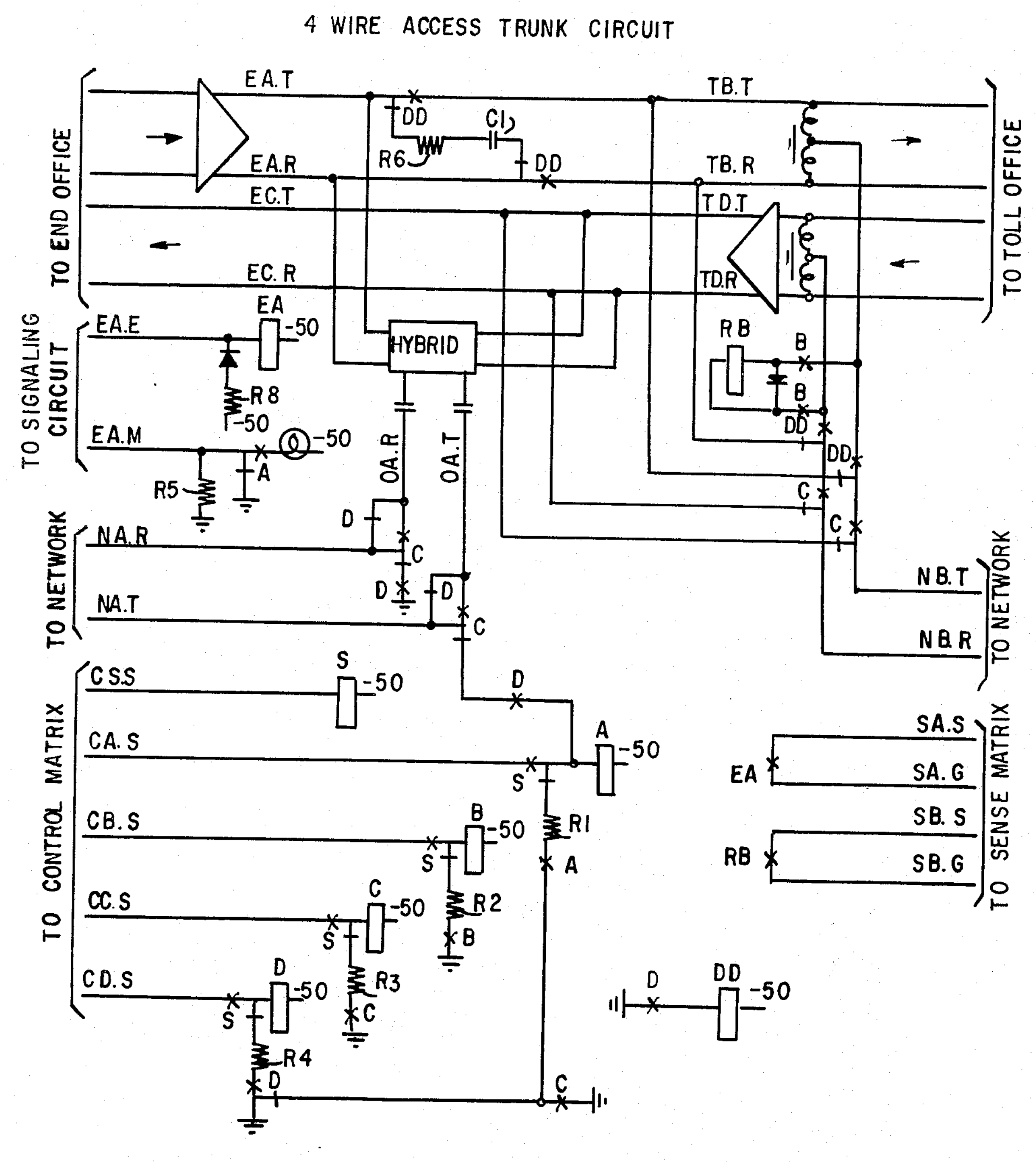
FIG. 6 is a schematic circuit diagram of a four-wire access trunk circuit.

The access trunk circuit enables a subscriber to be connected via an end office to the TSPS system for operator assistance and/or billing. The main function of the access trunk circuit is to monitor the calling and called subscribers's on-hook, off-hook supervision. Access trunk circuits are provided for both two-wire and four-wire transmission facilities. Schematic circuit diagrams for a two-wire access trunk circuit is shown in FIGS. 3 and 4. A schematic circuit diagram of a four-wire access trunk circuit is shown in FIG. 6.

The access trunk circuit:

a. Receives supervisory signals from the end office and toll office and repeats them to the sense matrix.

b. Sends supervisory signals under control of the control matrix to the end office and toll office.

c. Responds to control matrix commands to:

1. Control the connection of idle line terminations.

2. Control the switch-through of the transmission path from the end office to the toll office.

3. Provide a means to repeat multiple wink operator signals to the end office.

4. Provide an interconnection between the end office and toll office appearances and network appearances NA and network appearance NB.

The network appearance NA is used for connection to:

A. Multifrequency receiver.

B. Tone and announcement circuit.

C. Operator's position trunk circuit.

D. Coin control circuit.

E. Audio test circuit.

The network appearance NB is used for connection to:

A. Multifrequency receiver.

B. Multifrequency sender.

C. Audio test circuit.

Delayed Call Trunk Circuits

Delayed call trunk circuits (FIG. 2) are provided for the purpose fo enabling the operator to establish non-coin calls at a later time for customers who were unable to complete their original call. Delayed coin calls will be established by a cord board operator.

Figure 5:
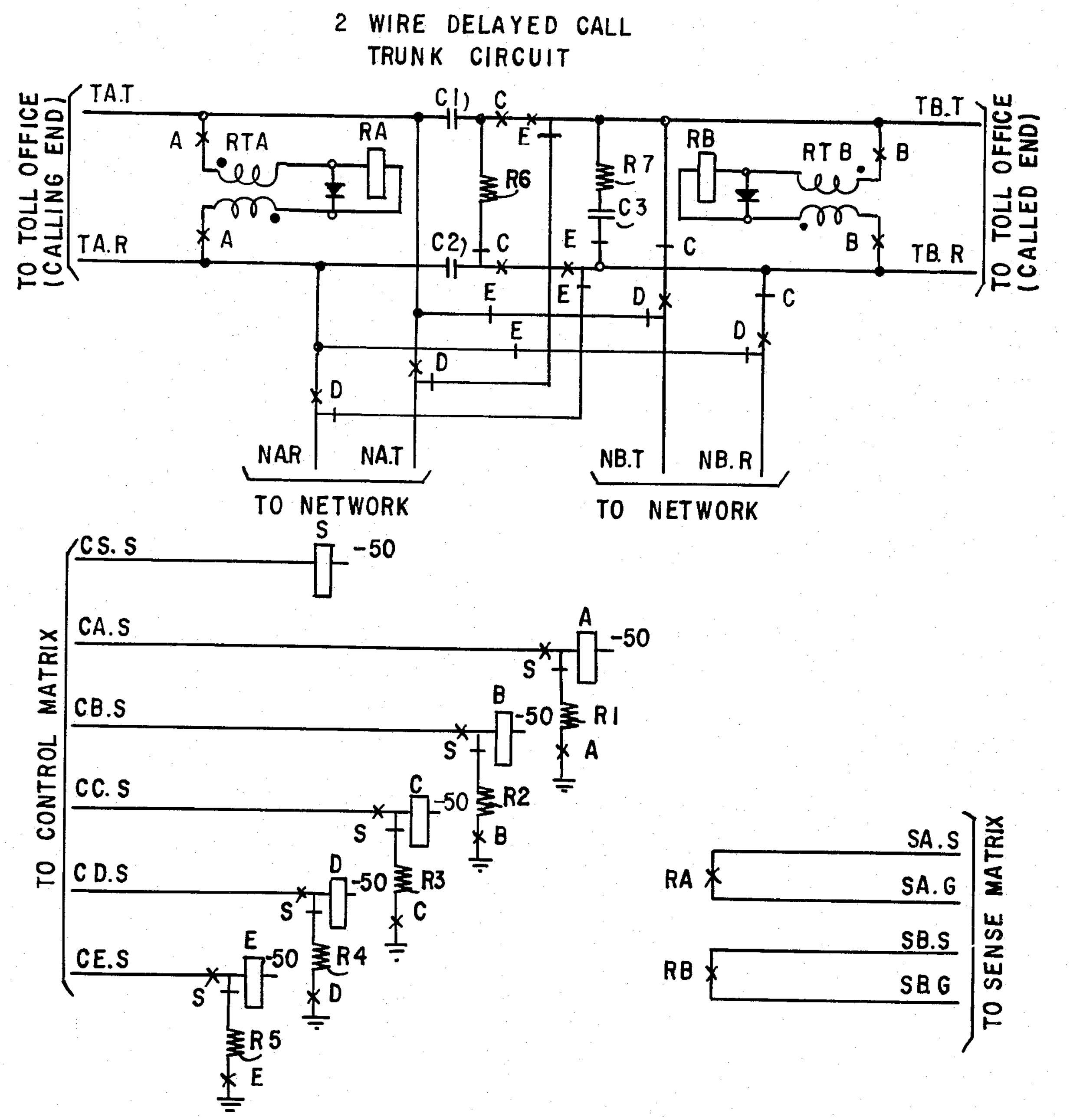
FIG. 5 is a schematic circuit diagram for a two-wire delayed call trunk circuit.
Figure 7:
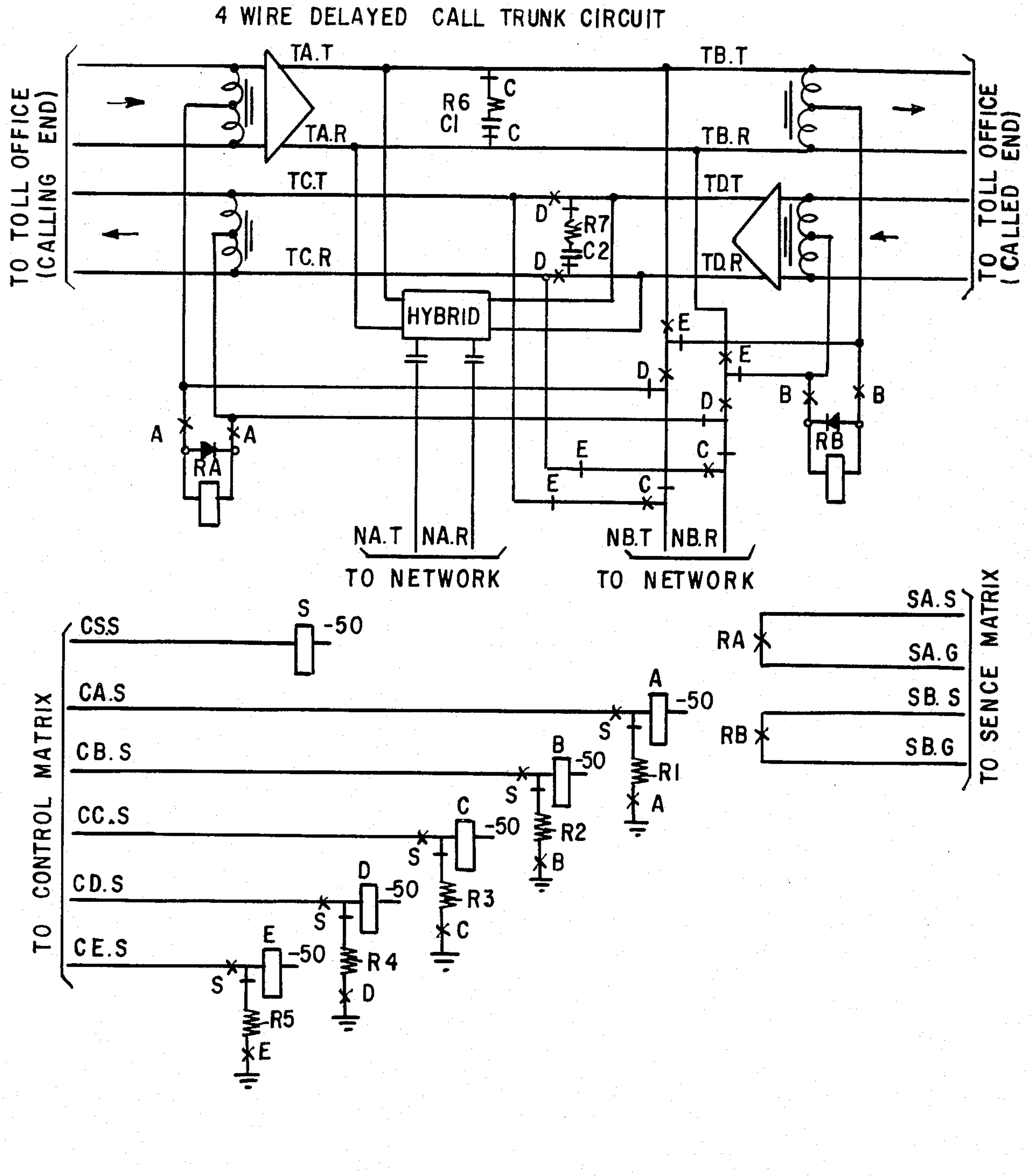
FIG. 7 is a schematic circuit diagram of a four-wire delayed call trunk circuit.

The delayed call trunk circuit has two appearances at the toll office. One appearance is arbitrarily assigned as the calling end; i.e. will be used to recall a local party whose call was delayed. This section of the trunk circuit corresponds roughly to the end office appearance of an access trunk circuit. The operator keys the recalled party's number into the calling number store of the trunk store. Conversely, the other appearance or the called end of the delayed call trunk circuit is equivalent to the toll office appearance of an access trunk circuit. The operator keys the called party's number into the called number store of the trunk store. In addition to delayed calls, the delayed call trunk circuit may be used for single ended calls, such as checking billing to third number, verification of busy, etc. Delayed call trunk circuits are provided for both two-wire and four-wire toll switching machines. Schematic circuit diagrams of two-wire and four-wire delayed call trunk circuits are shown in FIGS. 5 and 7, respectively.

The delayed call trunk circuit:

a. Sends supervisory signals under control of the control matrix to the calling end and called end toll office appearances.

b. Receives supervisory signals from the calling end and called end toll office appearances and repeats them to the sense matrix.

c. Responds to control matrix command to:

1. Control the connection of idle line terminations.

2. Control the switch-through of the transmission path from the calling end to the called end toll office appearance.

3. Provide an interconnection between the toll office appearances and the two network appearances (NA and NB).

The network appearance NA is used for connection to:

A. Operator's position trunk circuit.

B. Audio test circuit.

The network appearance NB is used for connection to:

A. Multifrequency sender.

B. Multifrequency receiver for application of a +130 volt DC simplex signal to the toll office.

C. Audio test circuit.

Operator Service Trunk Circuits

The operator service trunk circuits (FIG. 2) are used by the operator to reach an assistance position such as directory assistance, rate and route or a cord board (not for the purpose of extending a call) by direct access. There is a maximum of four groups of operator service trunks (one for each type of service) for a TSPS system complex.

Figure 8:
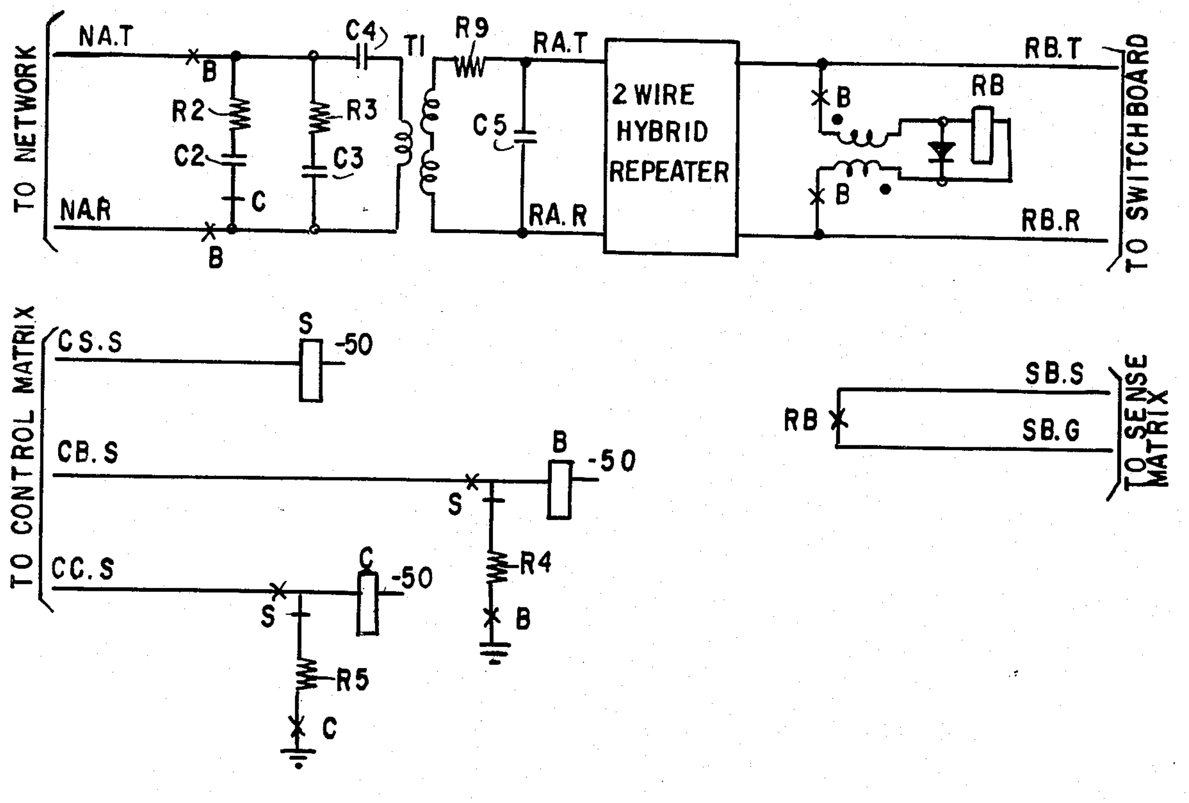
FIG. 8 is a schematic circuit diagram of an operator service trunk circuit.

The assistance operator may be bridged on a connection between an access or delayed call trunk circuit and the operator's position trunk circuit via the operator service trunk circuit, the network and a second network appearance of the position trunk circuit. A schematic circuit diagram of an operator service trunk circuit is shown in FIG. 8.

The operator service trunk circuit:

a. Sends supervisory signals under control of the control matrix to the switchboard appearance.

b. Receives supervisory signals from the switchboard appearance and repeats them to the sense matrix.

c. Responds to control matrix commands to:

1. Control the connection of an idle line termination.

2. Provide an interconnection between the switchboard appearance and network appearance NA.

The network appearance NA is used for connection to:

A. Operator's position trunk circuit.

B. Audio test circuit.

ONI Trunk Circuit

The ONI trunk circuit permits using system TSPS positions for operator number identification of the calling number of non-coin station-to-station (1+) toll calls which are not ticketed by the system TSPS.

Figure 9:
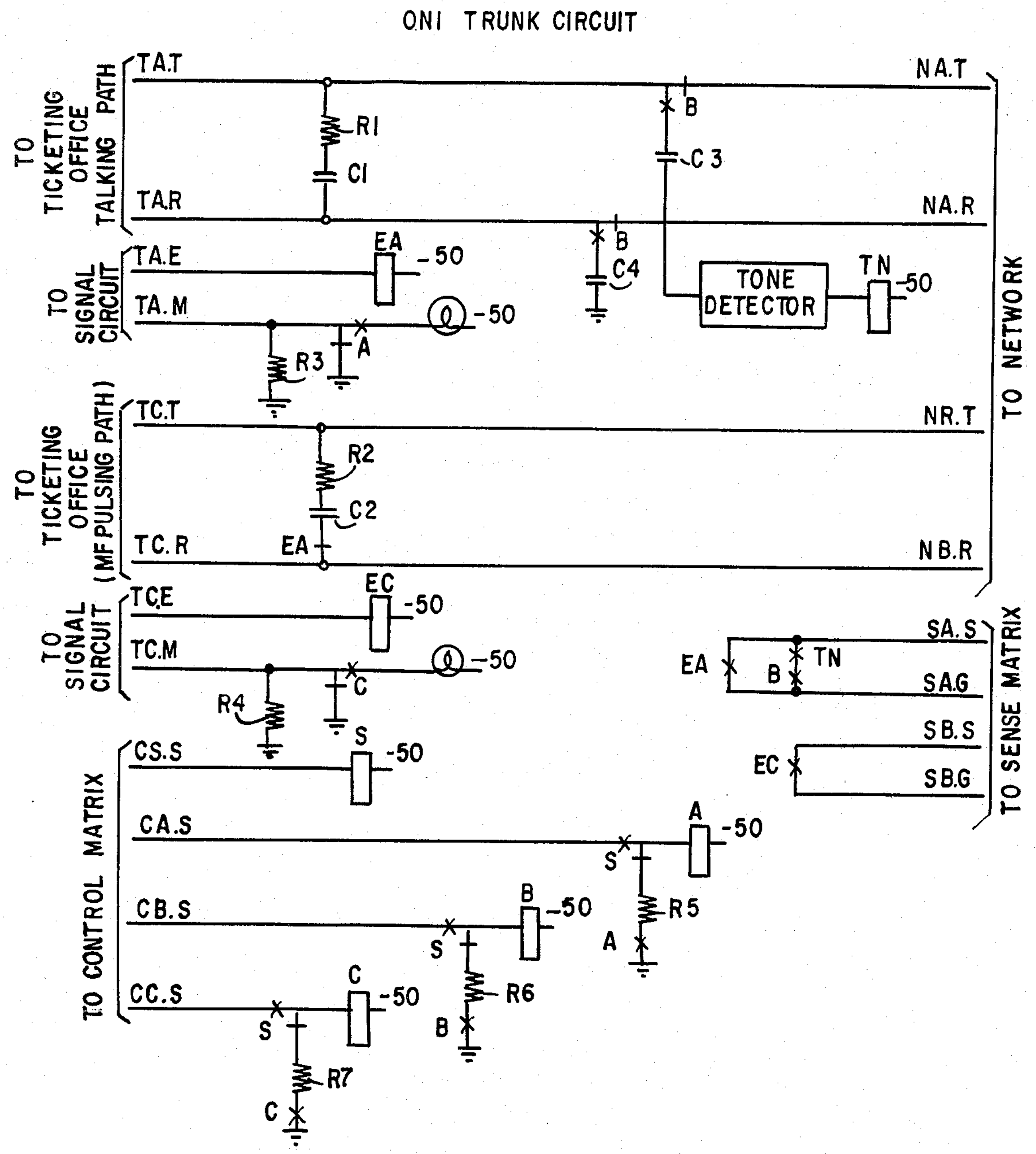
FIG. 9 is a schematic circuit diagram of an operator number identification trunk circuit.

Two voice channels are provided between the ticketing office and the ONI trunk circuit. One path is for talking and the other is for multifrequency pulsing of the calling number. A schematic circuit diagram of on ONI trunk circuit is shown in FIG. 9.

The ONI trunk circuit:

a. Receives supervisory signals from the ticketing office and repeats them to the sense matrix.

b. Sends supervisory signals under control of the control matrix to the ticketing office.

c. Transfers the talking path from the network appearance to a busy tone detector under the control of the control matrix.

d. Provides an interconnection between the ticketing office appearances and the network appearances (NA and NB).

The network appearance NA is used for connection to:

1. Operator's position trunk circuit.

2. Audio test circuit.

The network appearance NB is used for connection to:

1. Multifrequency sender.

2. Audio test circuit.

Interoffice Signaling

This section contains a description of all supervisory signals between the TSPS system trunk circuits and the interconnecting offices. The CPU unit takes appropriate action upon the receipt of the supervisory signals from the interconnecting offices as defined below except when the call is associated with a loop on an operator's position. In this case the unit CPU repeats the calling and called parties' supervision (on-hook or off-hook) to the operator; thus giving the operator complete control of the call. Any supervisory signal with a duration of less than 60 ms. is ignored.

Signals Between the TSPS System And The End Office

The signals between the end office outgoing trunk circuit and the access trunk circuit are as follows:

a. Idle — on-hook extended in both directions.

b. Seizure — off-hook extended from the end office.

c. Dial pulses — on-hook pulses from a nonsender end office. Pulsing limits are 8–12 pps with a 48–78% break ratio. The interdigital pause is between 300 ms. and 30 seconds. The interval after the seventh digit is limited to 4 seconds. If an insufficient number of digits have been received at the end of the 30 second time-out, TSPS connects the calling party to reorder tone on 1+ calls or to an operator on 0+ calls.

d. Delay Dial—off-hook extended to a senderized end office within 300 ms. after seizure. It is applied for a minimum duration of 140 ms. and is followed by an on-hook (start dial) when the TSPS system is ready to receive the called number. This will permit the TSPS system to be compatible with method A (wink start) or method B (delay dial) end office outgoing trunk circuit signaling arrangements. If the start dial signal is not sent to the end office within 3 seconds, the end office outgoing trunk circuit may remove the seizure signal by sending a calling party disconnect signal. The end office sender will time out within 3 to 30 seconds depending upon the type of end office switching machine and the traffic condition.

e. CLR Hold — off-hook extended from TSPS system to the end office after the called number has been received. This signal indicates that a multifrequency receiver is prepared to receive the calling number. It is also used as an operator attached indication.

f. Wink Signals — a series of on-hook pulses with a duration of approximately 100 ms. sent to the end office. The off-hook interval between pulses is also approximately 100 ms. The following signals are a series of one to five winks:

1 wink - Operator released 2 winks - Operator re-attached 3 winks - Coin collect 4 winks - Coin return 5 winks - Ringback The operator released or re-attached signals are not send to the end office on calls which are extended to a residual cord board.

g. Operator Recall — an on-hook with a duration between 140 ms. and 2.2 seconds followed by an off-hook with a minimum duration of one second extended from the end office to TSPS. This signal is not effective on 1+ non-coin calls.

h. Calling Party Disconnect — on-hook from the end office which is sustained for: –500 ms. if prior to CLR hold signal –700 ms. if after CLR hold signal on a 1+ non-coin call.

–2.2 seconds if after CKR hold signal on all other calls.

j. Normal Release — on-hook sent to the end office after the calling party has disconnected. It is send after on-hook has been extended to the toll office for at least 700 ms. After the trunk memory is cleared, the TSPS trunk circuit returns to idle.

k. Forced Release — steady on-hook sent to the end office after the CLR hold signal while the end office is extending off-hook. Within one second an on-hook (calling party disconnect) is received from the end office. The trunk memory is cleared and the TSPS trunk circuit returns to idle.

l. Busy Back – off-hook from the access trunk circuit to an idle end office outgoing trunk circuit.

m. Tones and Announcements — the following audible signals are sent to the end office from a tone and announcement trunk circuit via the access trunk circuit and the network during the CLR hold state of the access trunk circuit.

- Reorder: Low tone interrupted at a rate of 120 IPM. This signal is connected to the access trunk circuit under the following conditions:

An insufficent number of digits is received.

The subscriber remains on line after an announcement.

- Audible Ring (Ring Back Tone): Connected to the access trunk circuit if a position cannot be connected to the access trunk circuit within 4 seconds after the calling and/or called numbers are received.

- Recorded Announcement: Furnished to the calling subscriber during an overload condition or disasters Signals Between the TSPS System And The Toll Office The signals between TSPS and the toll office are as follows:

a. Idle — on-hook extended in both directions.

b. Seizure — off-hook extended to the toll office.

c. Delay Dial — off-hook from the toll office with a minimum duration of 140 ms.

d. Start Dial — on-hook occurring after delay dial from the toll office. It indicates that the toll office receiver is ready to receive MF pulses. Multifrequency pulsing from TSPS system may proceed after a nominal 200 ms. delay after the receipt of the start dial signal.

e. Answer — off-hook for at least one sec. from the toll office occurring after the called number is outpulsed.

f. Ring Forward — a 100 ± 30 ms. rering pulse sent to the toll office.

This signal is used to recall an operator at a distant position. It is initiated by the TSPS operator when the RING FWD or RING BACK (on delayed calls only) key is operated.

NOTE:

The rering is a +130 volt D.C. simplex pulse on loop trunks to Crossbar Tandem and No. 4 Crossbar toll machines. The rering on all other trunks is a timed on-hook pulse.

g. Toll Line Release — on-hook to the toll office with a duration of at least 700 ms. which causes the forward connection to be dropped.

h. Toll Office Disconnect — on-hook from the toll office occurring after answer.

If the signal from the end office is an off-hook, a timeout interval of 20 seconds is started. If the toll office returns an off-hook before the timeout, the disconnect is ignored. If either the timeout is completed or the calling party has been disconnected for more than 2.2 seconds (700 ms. on a 1+ non-coin call), the TSPS trunk circuit extends an on-hook (toll line release) to the toll office.

Signals Between The TSPS System And A Residual Cord Board

The signals between the TSPS system and a cord switchboard via the toll office are as follows:

a. Calling Party Recall — a 100 ± 30 ms. rering pulse sent forward from the TSPS system.

b. Calling Party Disconnect — two 100 ± 30 ms. rering pulses sent forward from the TSPS system. The interval between pulses is 300 ± 30 ms.

c. Coin Control — a 100 ± 30 ms. on-hook pulse from the cord board followed by inband tones. After receipt of the tones, the appropriate wink coin control signals will be sent to the end office.

d. Release of Cord Board — on-hook extended to the cord board for at least 700 ms. It is applied after the calling subscriber and cord board operator have been disconnected for at least 2.2 seconds and 200 ms., respectively.

Signals Between The TSPS System And SATT Or CAMA

The signals between an external ticketing office (SATT or CAMA) and the TSPS ONI trunk circuit are as follows:

a. Idle — on-hook extended toward the TSPS system from the ticketing office on both the talking and multifrequency pulsing paths.

b. Make Busy — on-hook extended toward the ticketing office on both the talking and multifrequency pulsing paths.

c. Position Available — off-hook toward the ticketing office on both the talking and multifrequency pulsing paths.

d. Seizure — off-hook toward the TSPS system on the multifrequency pulsing path.

e. Position Busy — on-hook on the multifrequency path and off-hook on the talking path toward the ticketing office. This signal indicates that a tone detector is connected to the talking pair. After the sender attached signal is received, it indicates that a position is connected.

f. Order Tones — the following tones are detected on the talking path of the ONI trunk circuit during the tone detect state.

- A single order tone of 480 Hz with a duration between 0.42 and 1.38 seconds signifies an ANI failure type of call.

- A double order tone of 480 Hz signifies an ONI (operator identified) type of call. This tone has the following timing:

Tone on - 50 to 175 ms.

Tone off - 50 to 175 ms.

Tone on - 50 to 175 ms.

g. Sender Attached — off-hook toward the TSPS system on the talking path.

h. Reorder — on-hook on the talking path and off-hook on the MF pulsing path toward the TSPS system with a duration of at least 100 ms. after the calling number has been received. This condition persists until the TSPS operator operates either the KP Back key or the Position Disconnect key.

i. Position Disconnect — on-hook on both the talking and multifrequency pulsing paths toward the ticketing office. After a release signal is received, the TSPS system returns a position available signal to the ticketing office.

j. Release — on-hook on both the talking and multifrequency pulsing paths toward the TSPS system.

Trunk Control Circuits

Figure 10:
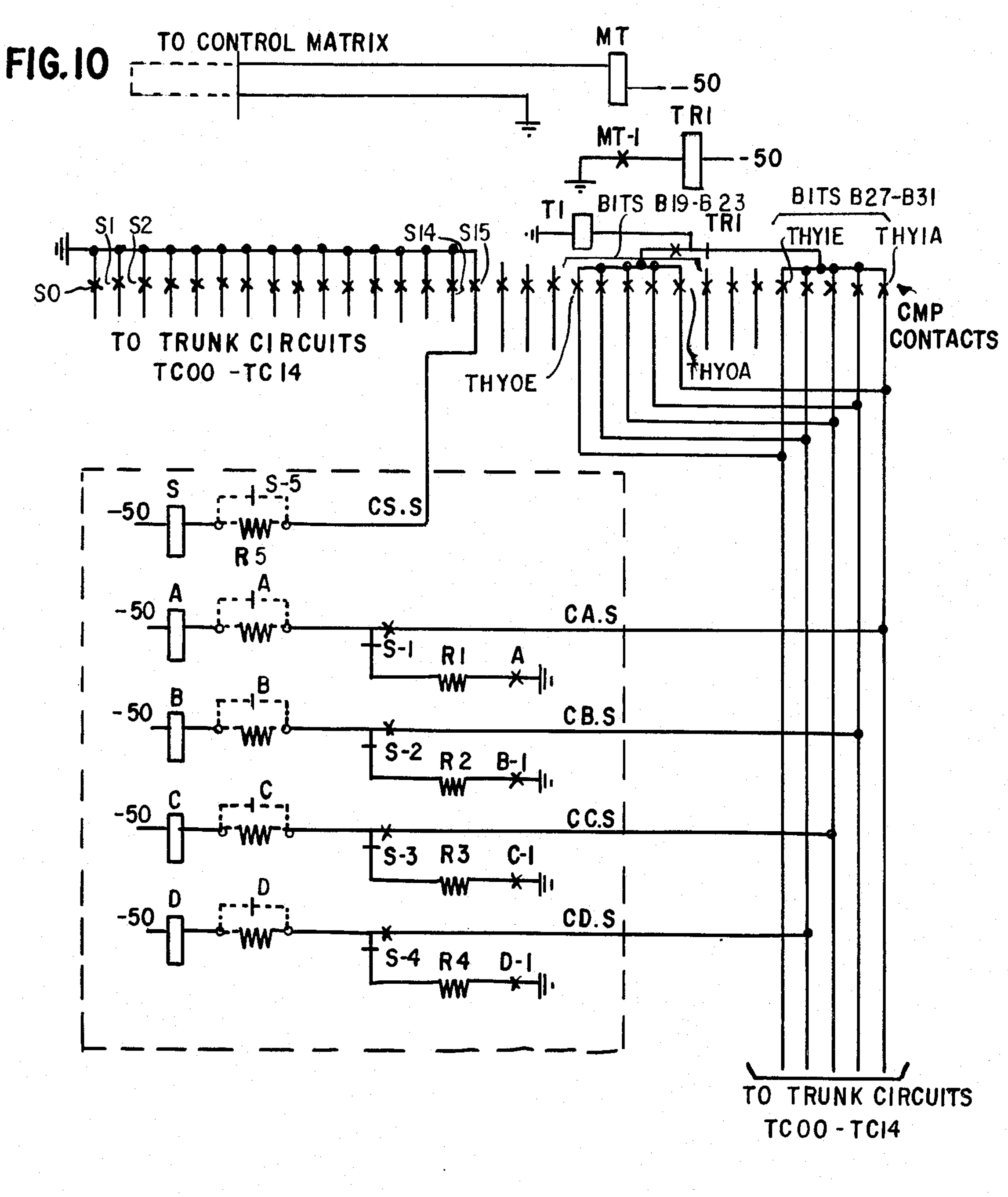
FIG. 10 is a simplified schematic circuit diagram of a typical trunk circuit.

Referring to FIG. 10, there is shown a simplified schematic circuit diagram for a typical trunk circuit TC15. The trunk circuit TC15 includes a select relay S and control relays A, B, C, and D. The operation of the select relay is controlled by an output of the control matrix represented as a normally open contact S15 which is connected between ground and the control path to the select relay S, such as path CSS. The select relay S, when operated, serves to connect the control relays A-D to the trunk control highway over transfer contacts S-1 to S-4 and conductors CAS-CDS, respectively. Contacts THYO A–E and THYL A–E represent outputs of the control matrix which enable energization of the trunk circuit control relays, such as relays A–D via trunk highway THYO or THYL, respectively. The control output matrix contacts THYO A–E and THYL A–E are selectively operable in accordance with commands provided by the common control to extend ground over highway test relay T1 and highway transfer relay TR1 to the control relays A–D. The trunk highway extends to trunk circuit TC15 as well as to the remaining 15 trunk circuits TC00– TC14 of trunk group THGO.

Figure 11:
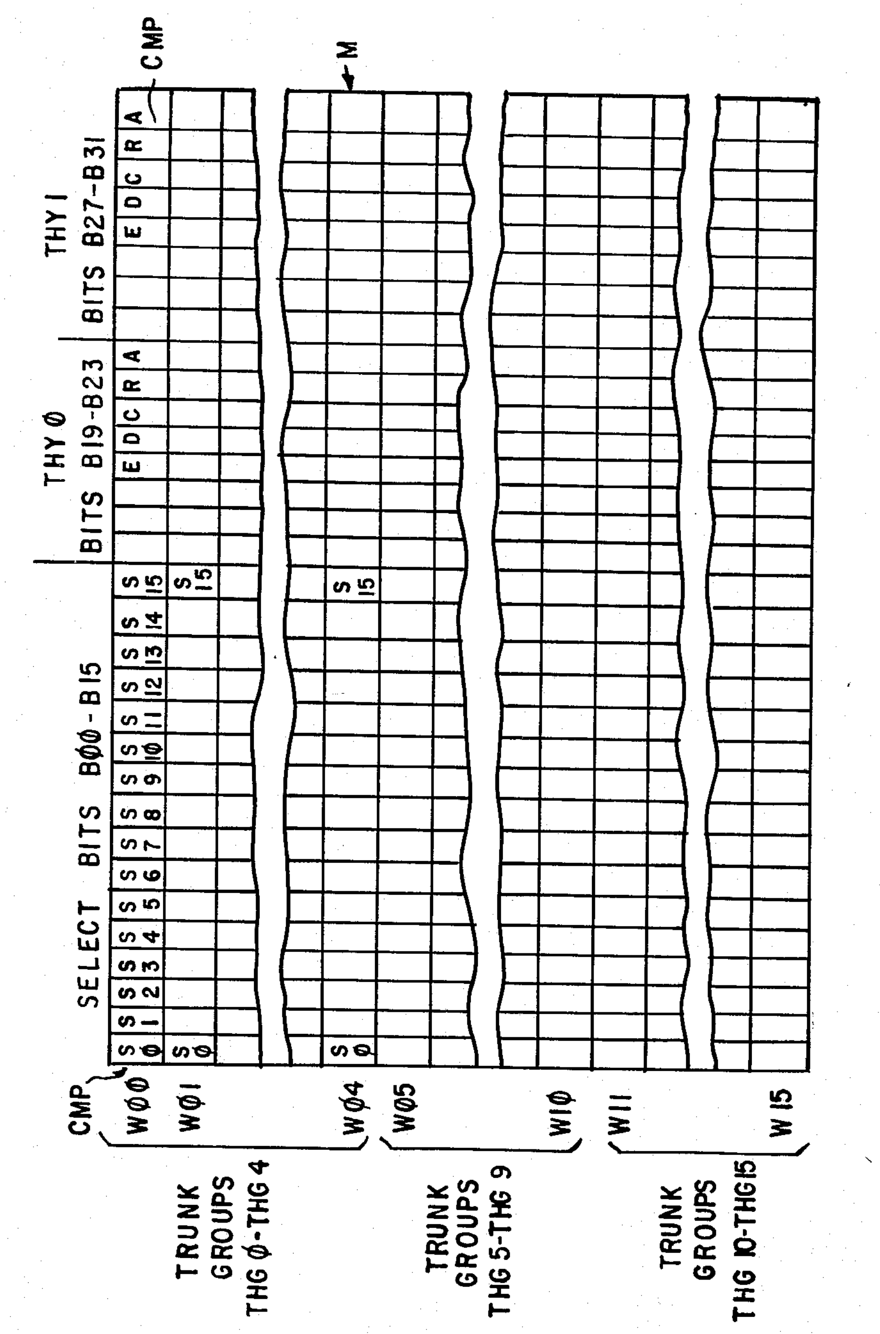
FIG. 11 is a diagramatic layout of the control matrix.

Referring to FIG. 11, there is shown the layout of a portion of the control matrix which is assigned to the trunk circuit control. The control matrix field M is a word oriented memory of 16 words WOO through W15. Each word comprises 32 bits BOO through B31. The individual bits of the control matrix word serve as control matric points CMP. The output of a control matrix point CMP into the controlled equipment may, for example be a correed relay contact in the trunk circuit control. Each trunk relay group, such as trunk relay group THGO which consists of 16 trunk circuits TCOO–TC15, is controlled by a different word of the control matrix, such as word WOO for trunk group THGO. Bits BOO–B15 of word WOO control contacts SO–S15, FIG. 10, to enable selection of a trunk circuit of trunk group THGO. Bits B16–B23 and bits B24–B31 of each matrix word form two 8-bit fields of which five bits are used for each trunk highway THYO and THY1, respectively. Thus bits B19–B23 and bits B27–B31 control the operation of output relay contacts THYO A–E and THY1 A–E, respectively. It is pointed out that while five bits are provided for each trunk highway THYO, THY1 fewer bits may be required for the control of a given trunk circuit. For example, for trunk circuit TC15, which includes only four control relays A–D, bits B31, B30, B29, and B28 control the energization of control relays A, B, C, and D, respectively over trunk highway THY1 Similarly, bits B23, B22, B21, and B20 control the energization of relays A, B, C and D, respectively via trunk highway THYO.

The control matrix points of words WOO–WO4 control trunk groups THGO–THG4 which include trunk circuits TCOO–TC79. similarly, matrix words WO5–W10 control trunk groups THG5–THG9 which include trunk circuits TC80–TC159, and words W11–W15 control trunk groups THG10–THG15 which include trunk circuits TC16–TC255.

The manner in which the state of the control matrix points of the control matrix is set forth in the above-referenced peripheral controller application. For purposes of this description, it is sufficient to know that the common control apparatus, in response to signals received over the sense matrix employs call processing software to determine the desired status for the various trunk circuits TC00–TC255 and responsively effects the writing of true bits into locations of the control matrix to enable selection of a given trunk circuit and the enabling of control relays associated with such trunk circuit.

Thus, for example, assuming a request for service has been received by trunk circuit TC15 and that such request for service indicates that relays A and B of trunk circuit TC15 are to be operated, the common control would effect writing of a true bit into bit position B15 to enable selection of trunk circuit TC15 and further true bits into bit locations B22 and B23 and B30 and B31. It is pointed that if status requests for more than one trunk circuit within a given trunk group are received, only the request for one trunk circuit of the given group is answered at a given time. The remaining requests are placed in a queue until a previous request can be answered.

As soon as true bits have been written into bit locations of the control matrix, the corresponding correed output relays will be enabled causing energization of the select relay S and control relays A–D in accordance with the bits read into the word.

Typical Trunk Circuit Control Relay Operation

The following is a brief description of the normal sequence of highway control for two complete 40 millisecond control cycles. Each cycle consists of four 10 millisecond sequence states. In the first 40 MS cycle, relays A and B of a selected trunk circuit are operated. In the second cycle, relay A remains operated and relay B restores.

Figures 14A, 14B, 14C:
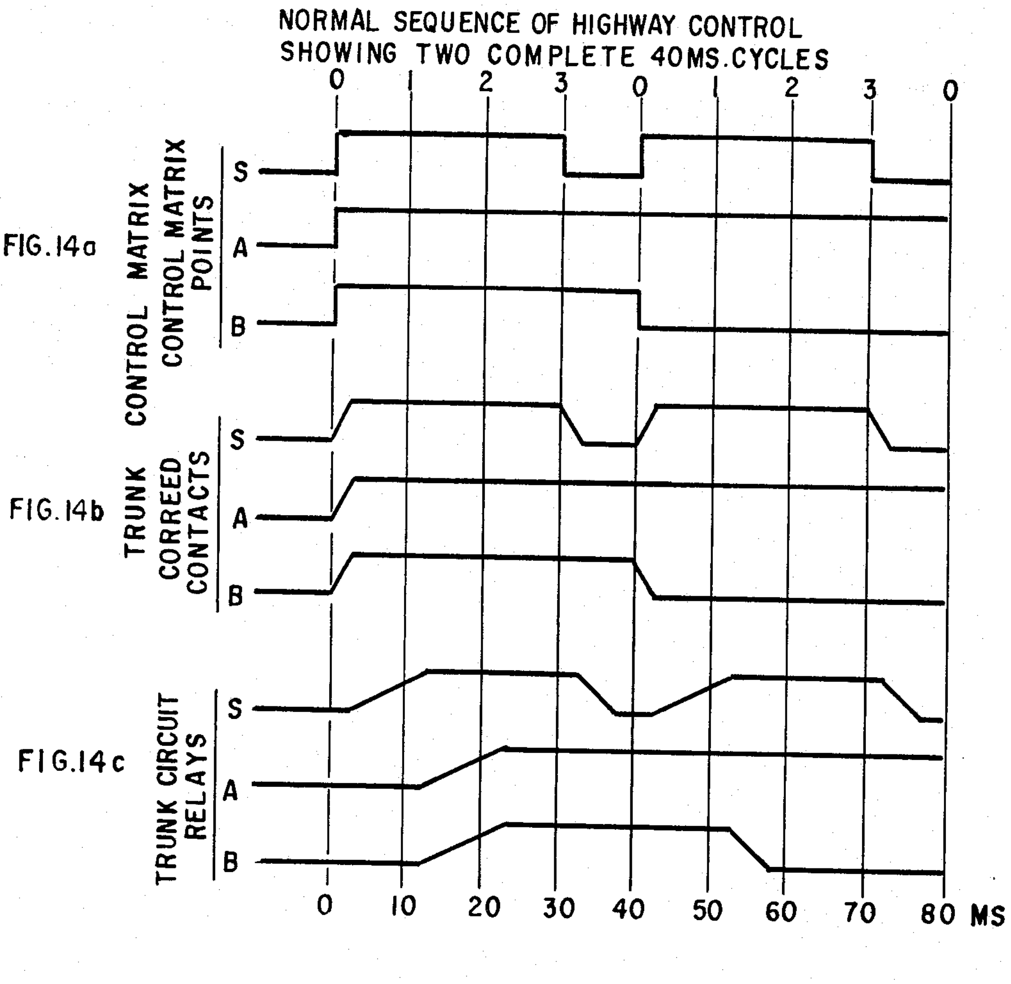

Referring to FIGS. 14A, 14B and 14C, which show wave forms of the control matrix points, the correed contacts, and trunk circuit relays S, A and B, respectively, the operation of the first cycle is as follows. During sequence state O, when the control matrix points corresponding to the select relay S, and control relays A and B become true, as shown in FIG. 14A, the trunk control matrix correeds operate, as shown in FIG. 14B, closing contacts S15 and THY1 A and B. The select relay S for trunk circuit TC15 is energized as shown in FIG. 14C. During sequence state 1, when relay S operates, transfer contacts S-1 through S-4 close connecting control relays A–D to the trunk highway THY1. Accordingly, relays A and B are energized as shown in FIG. 14C.

During sequence state 2, control relays A and B operate and hold in series with current limiting resistors R5 and R6, respectively. During sequence state 3, trunk control matrix bit S is written false causing correed S to restore as shown in FIG. 14B. Accordingly trunk circuit select relay S restores as shwon in FIG. 14C. However, relays A and B hold in series with break contacts of relay S over holding paths provided over resistors R1 and R2 and contacts A-1,B-1, respectively.

For the second cycle of operation, during sequence state 0, the select bit S is written true as shown in FIG. 14A and the control bit for control relay B is written false. Accordingly, correed S will operate and correed B will restore while correed A remains operated as shown in FIG. 14B. During sequence state 0, trunk circuit relay S is energized as shown in FIG. 14C. During sequence state 1, relay S operates holding in series with current limiting resistor RS and transfers the holding path of trunk circuit control relays A, B, C and D to the highway. Relay A remains operated since the control bit is written true and correed A is energized. However, relay B becomes deenergized. During sequence state 2, relay B restores. During sequence state 3 trunk control matrix correed 15 is restored when bit S is written false and accordingly trunk circuit select relay S restores as shown in FIG. 14C. However, relay A continues to be energized over the holding path established via resistor R1 and contacts A1 of relay A. Thus, it is apparent that under each select operation, the energization and the deenergization of the control relays A– D is under the control of the trunk control highway THY1 (or THY0). The control relays A–D, once energized, remain energized over holding paths established over make contacts of relays A–D when the select relay S is deenergized.

The use of the select relays and a common trunk control highway for energizing the control relays associated with groups of trunk circuits minimizes the amount of control points required. For example, the access trunk circuit which constitutes the majority of trunk circuits for a given TSPS system includes four control relays. For a given group of trunk circuits, consisting of 16 trunk circuits, 64 such control relays would be required. In the system provided by the present invention, only 32 bit positions enable control of 64 relays. Moreover, only 23 such bit positions need be implemented to provide a duplicated trunk highway. Known systems have required at least 64 control points for effecting control of 16 such trunk circuits.

Trunk Highway Transfer

The manner in which trunk highway transfer is effected will now be set forth. Trunk highway configuration for trunk groups THG0 for example, is provided by the trunk highway group transfer and test circuit TT1 shown in FIG. 1. Trunk highway THY1 is normally configured as the active highway and trunk highway THY0 is normally configured as the standby highway to supply operating signals to control relays of the trunk circuits, such as control relays A–D of trunk circuit TC15 shown in FIG. 10.

Figure 13:
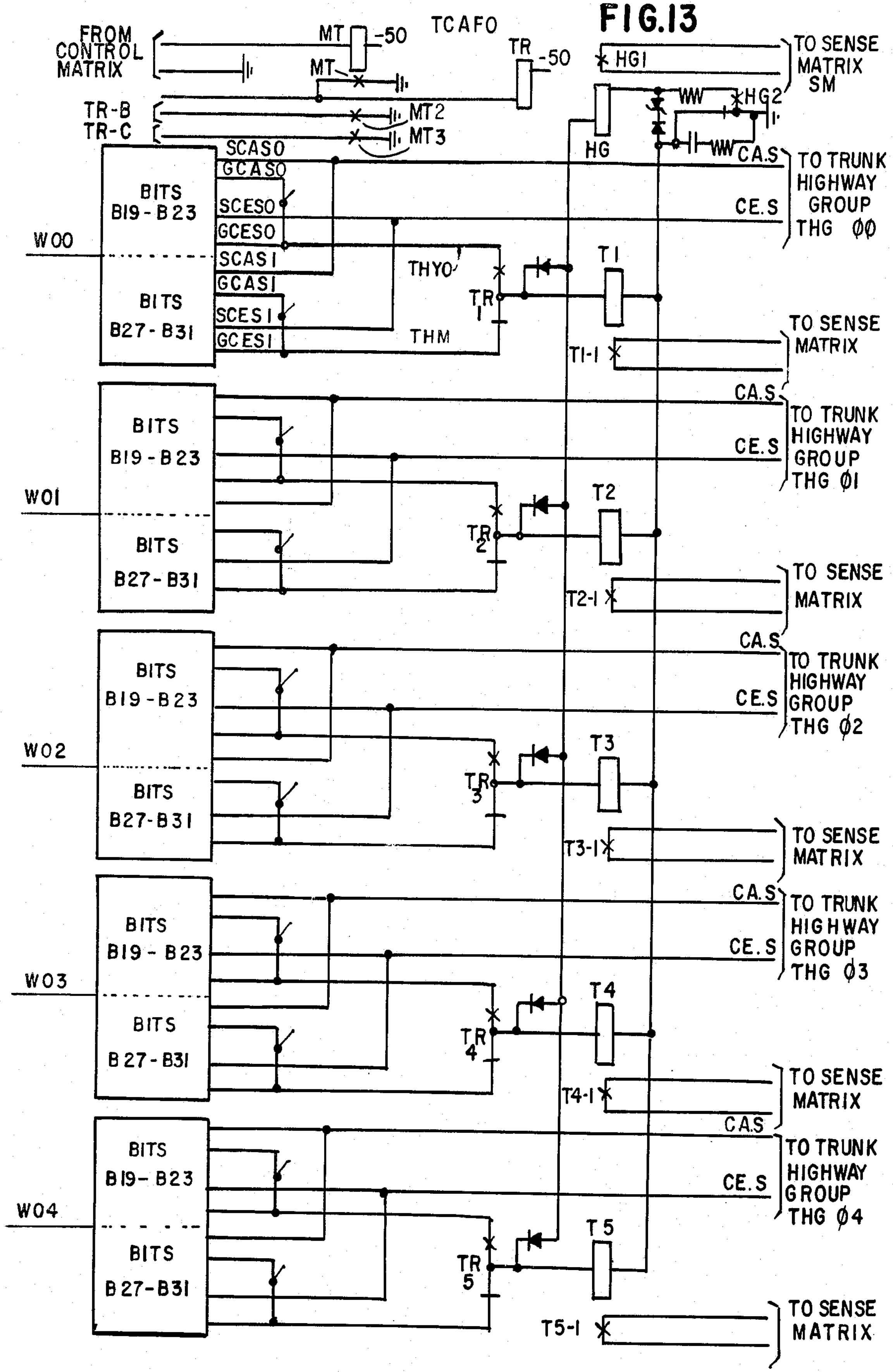
FIG. 13 is a detailed schematic circuit diagram for a portion of the trunk transfer and test circuits provided by the present invention.

A schematic circuit diagram for a portion of the trunk control circuits including transfer and test circuits TT1–TT5 is shown in FIG. 13. Transfer and test circuits TT1–TT5 include test relays T1–T5, respectively, and transfer contacts TR1–TR5 of transfer relay TR-1 of trunk highway transfer control circuit TRA1. Trunk highway transfer relay TRA1 controls the transfer from trunk highway THY1 to trunk highway THY0 for five trunk circuit groups THG0–THG4, via contacts TR1–TR5, respectively. The trunk highway transfer control relay TRA-1 is in turn controlled by a master transfer relay MT of the trunk master transfer circuit. The trunk highway transfer control relay TRA-1 is connected between battery and ground over normally open contacts of master relay MT. Accordingly, transfer contacts TR1–TR5 of relay TRA-1 are normally unoperated and trunk highway THY1 is normally selected as the active trunk highway THY0 is selected as the standby highway.

Considering trunk highway group transfer and test circuit TT1, ground is normally extended over normally unoperated contacts HG2 of a relay HG over the operating coil of relay T1 to the normally unoperated transfer contacts TR-1 of relay TRA1. Such ground level is extended over the normally closed contact of transfer contact TR-1 over conductors GCAS1–GCES1 to the correed contacts (FIG. 10) of the control matrix controlled by bits B27–B31 and returned over conductors SCAS1–SCES1 to the trunk highway over conductors CAS–CES.

Similarly, the normally open transfer contact TR-1 is extended over conductors GCAS0–GCES0 to correed contacts associated with bits B19–B23 of the control matrix and returned over conductors SCAS0–SCES0 to the trunk highway over conductor CAS–CES.

Thus, whenever one or more of the correed relays of the control matrix output are operated in response to commands provided by the common control, ground is extended over relay T1 and the normally closed transfer contact TRA-1 whenever highway THY1 is active and thence over the contacts of the correed relays which are closed to the corresponding trunk highway leads CAS–CES. It is apparent that relay T1 is energized whenever one or more of the correed contacts are closed to effect the energization of one or more of the control relays of a trunk circuit. Relay T1 has associated contacts T1-1 which are extended to the sense matrix SM shown in FIG. 12 to provide an indication to the common control that the correeds have been operated in response to commands provided by the common control. Thus, whenever any of the contacts of the test relays T1–T5 are closed, an indication is provided to the common control that one of the trunk circuit control relays has been energized via the trunk highway.

Relay HG which is connected in parallel with each of the test relays T—T5 is operable as a current sensing relay to detect the energization of more than one of the test relays T1–T5 simultaneously. In the event that more than one of the highway test relays T1–T5 is energized at the same time, as may be caused by stuck contacts, relay HG is energized closing contacts HG-1 providing an indication to the sense matrix of excessive current flow in the trunk highway conductors.

Trunk highway transfer and test circuits TT2–TT5, including test relays T2–T5 are connected to extend ground to corresponding trunk highways in the manner set forth above with reference to trunk highway transfer and test circuit TT1. In addition, test relays T2–T5 have corresponding contacts T2-1 through T5-1 which are extended to the sense matrix.

In the event that a fault is detected, as may be indicated by the failure of a test relay, such as test relay T1, to operate when commands have been provided to the control matrix word associated with trunk group THG0 the trunk highway configuration can be transferred from trunk highway THY1 to trunk highway THY0 under the control of the common control which extends a command to the control matrix to effect operation of the master transfer relay MT. When master transfer relay MT operates closing contacts MT-1, relay TRA will energize, operating transfer contacts TR1–TR5 thereby transferring the ground extended over relays T--T5 from conductors GCAS1–GCES1 to conductors GCAS0–GCES0.

It is pointed out that trunk highway group transfer and test circuits TT6–TT10, which are controlled by trunk highway transfer control circuit TRB, and trunk highway group transfer and test circuits TT11–TT16, which are controlled by trunk highway transfer control circuit TRC, are similar to trunk highway group transfer and test circuits TT1–TT5. In addition, trunk highway transfer control circuits TRB and TRC each include transfer relays similar to relay TRA of trunk highway transfer control circuit TRA. Whenever relay MT is operated, relays TRA, TRB and TRC are energized to effect transfer from trunk highway THY1 to trunk highway THY0 for all trunk groups THG0–THG15. Thus all 16 highway groups are transferred from the active trunk highway THY1 to the standby trunk highway THY0.

Examples of Trunk Circuits

The manner in which the trunk control arrangement provided by the present invention is employed to provide various operating configurations for trunk circuits will become apparent from the following descriptions of the trunk circuits which indicate states for the control relays associated therewith.

Two-Wire Access Trunk Circuits

Figure 12:
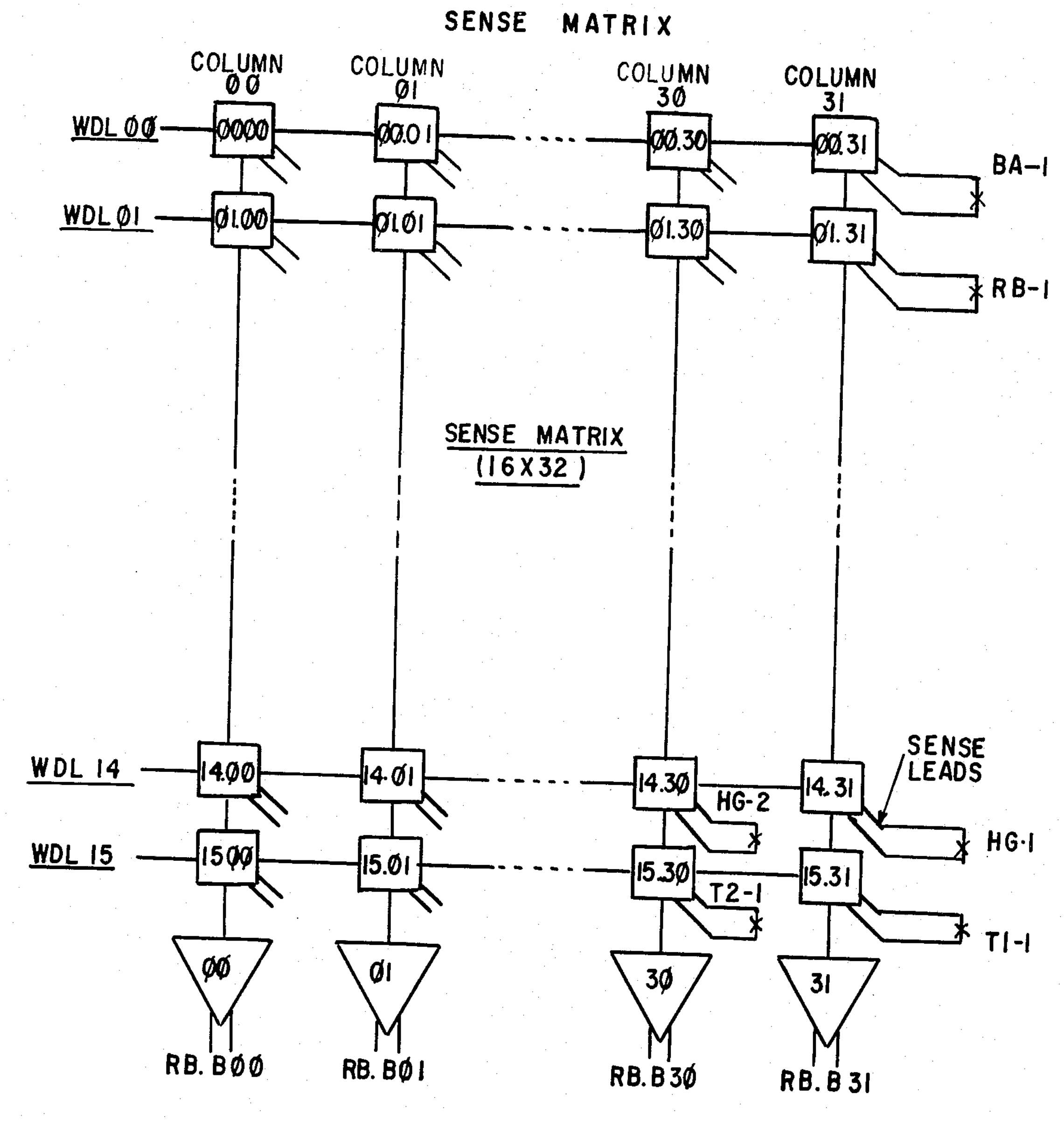
FIG. 12 is a block diagram representation of the sense matrix.

A schematic circuit diagram of the two-wire access trunk circuit is shown in FIG. 3. The trunk circuit includes a loop condition sensing relay BA which is bridged across the line EAT, EAR to an end office via transfer contacts of a control relay A of the trunk control circuit. A further relay RB is bridged across conductors TBT and TBR which extend to a toll office via coils L1 and L2 and contacts B-2 of a control relay B of the trunk circuit. As indicated above, the access trunk circuit receives supervisory signals from the end office via relay BA which has a pair of contacts BA-1 extended to the sense matrix SM (FIG. 12). Relay RB receives supervisory signals from the toll office and extends such signals to the sense matrix (FIG. 12) via contacts RB-1.

The two-wire access trunk circuit includes control relays A, B, C and D which are controlled by the control matrix via the trunk highway. The access trunk circuit further includes a select relay S which is controlled by a dedicated control matrix point. Relay S connects the access trunk circuit to the trunk highway. Relay A extends on-hook, off-hook supervision toward the end office by controlling the reversal of polarity on conductors EAT, EAR. Relay B extends on-hook, off-hook supervision toward the toll office via normally open contacts B-2, which connect relay RB to conductors TBT, TBR which extend to the toll office. Relays C and D provide four control states for the two-wire access trunk circuit as will be described hereinafter. Relay C includes contacts C-2, C-3, C-4, C-5 and relay D includes contacts D-2, D-3, D-4 and D-5. Selective operation of relays C and D enable connection of the two-wire access trunk circuit to the inlet side of the network via conductors NAT and NAR to provide connection to a multifrequency receiver, tone and announcement circuit, on operators' position circuit or a coin control circuit, such connections being made via network appearance NA. Relays C and D also control connection of the toll office side of the two-wire access circuit to the outlet portion of the network to enable connection to a multifrequency receiver, or a multifrequency sender, for example. Such connections being made via a network appearance NB. Each access trunk circuit contains sense points SA and SB via contacts BA-1, RB-1, respectively of relays BA and RB. When contacts BA-1 are closed, this is an indication of an off-hook condition from the end office which is the appearance EA of the trunk circuit. When contacts RB-1 are closed, this indicates an off-hook condition from the toll office (provided that relay B is operated) which is the appearance TB of the trunk circuit.

Access Trunk Circuit Configurations

Figure 15A:
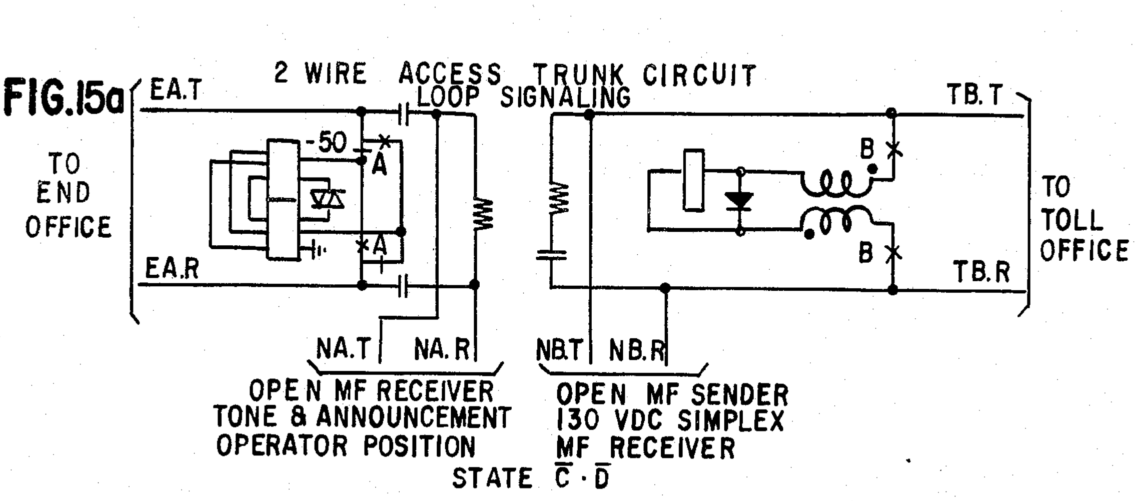
FIGS. 15*a*–15*d* illustrate control states for the two-wire access trunk circuits.

State $\bar{C}.\bar{D}$ (See FIG. 15*a*), (relays C. D unoperated)

a. In this state:

1. Both the EA and TB appearances are terminated.

2. The EA appearance is connected to the NA appearance.

3. The TB appearance is connected to the NB appearance.

b. Typical uses of this state:

1. $\bar{A}.\bar{B}$. (relays A, B, C and D unoperated)

A. Idle.

B. Called number reception via:

- Dial pulsing.
- Multifrequency pulsing to a multifrequency receiver connected to the NA appearance.

2. $A.\bar{B}$. (relay A operated, relays B–D unoperated)

A. Delay dial.

B. CLR hold.

C. Reception of the calling number by a multifrequency receiver connected to the NA appearance.

D. Transmission of reorder tone, audible ring or recorded announcement to the calling subscriber from a tone and announcement circuit connected to the NA appearance.

E. Connection between the calling subscriber and an operator's position trunk circuit via the NA appearance.

F. Connection of a multifrequency sender to the NB appearance. Multifrequency pulsing is to occur in state $A.B.C.\bar{D}$.

G. Toll line release.

H. Busy back to the end office.

3. A.B. (relays A and B operated, relay C and D unoperated)

Connection of a multifrequency receiver to the NB appearance for:

A. Sending +130 volt DC simplex rering pulses to a cord board if the toll office is NO. 4 crossbar or XBT.

B. Receiving inband coin control signals from a cord board.

Figure 15B:
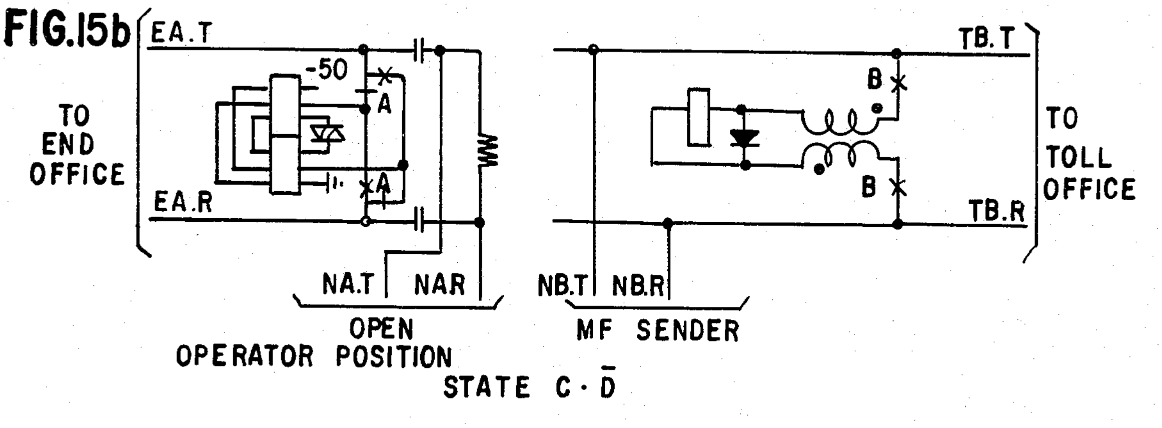

State $C.\bar{D}$ (FIG. 15*b*)

a. In this state:

1. The EA appearance is terminated.

2. The TB appearance is terminated by a multifrequency sender connected to the NB appearance.

3. The EA appearance is connected to the NA appearance.

4. The TB appearance is connected to the NB appearance.

b. Typical uses of this state:

1. A.B. (relays A-C operated, relay D unoperated)

A. Seizure of the toll office incoming trunk circuit.

B. Multifrequency pulsing of the called number.

Notes:

1. Connect the multifrequency sender to the NB appearance in state $A.\bar{B}.\bar{C}.\bar{D}$.

2. Then set this circuit to state A.B.C.$\overline{\text{D}}$. to seize the toll office incoming trunk circuit.

3. Then send the called number after the start dial signal is received from the toll office (Contact SB changes from off-hook to on-hook).

4. Then set this circuit to the desired state.

5. Then disconnect the multifrequency sender.

This sequence maintains a constant idle line termination on the TB appearance.

C. Connection maintained between the calling subscriber and an operator via the NA appearance.

2. A.$\overline{\text{B}}$. (relay A and C operated, relays B and D unoperated)

A. Toll line release prior to end of multifrequency pulsing.

B. Connection maintained between the multifrequency sender and the toll office.

C. Connection maintained between the operator and calling subscriber.

Figure 15C:
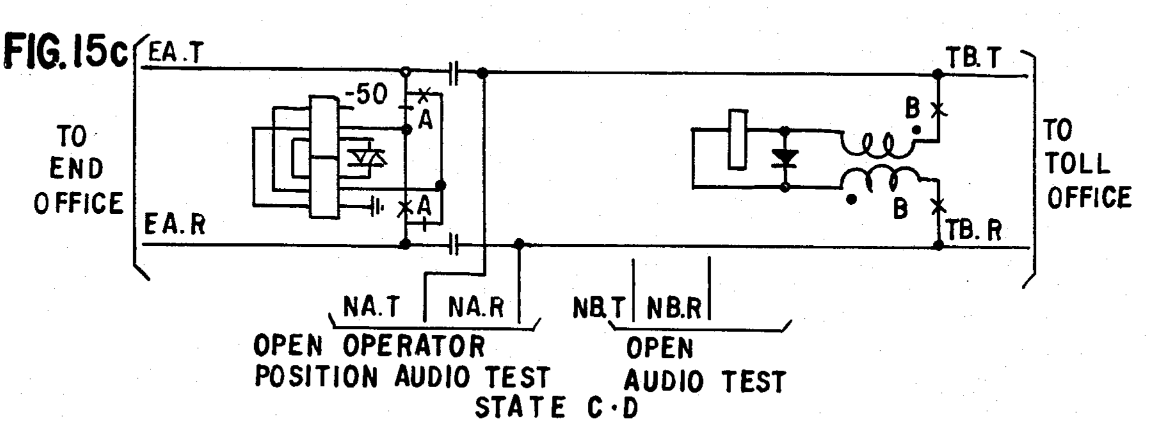

State C.D (FIG. 15*c*)

a. In this state:

1. The EA appearance is switched through to the TB appearance.

2. Both idle line terminations are removed.

3. The NA appearance bridges the transmission path between the EA and TB appearances.

4. The NB appearance is disconnected from the circuit to reduce capacitive bridging losses.

b. Typical uses of this state:

1. A.B.

A. Switch-through from calling subscriber to the called station.

B. Answer.

C. Bridging of the operator on the connection between the calling and called subscribers via the NA appearance.

2. A.$\overline{\text{B}}$.

A. Rering forward to a toll office not requiring DC simplex rering.

B. Connection maintained between the calling subscriber and the operator via the NA appearance.

C. Audio test.

Notes: 1. The NB appearance is open circuited in the trunk circuit.

2. The NA appearance has normal battery provided by the battery feed relay in the toll office incoming trunk circuit.

3. Busy back to the end office is provided during the audio test.

Figure 15D:
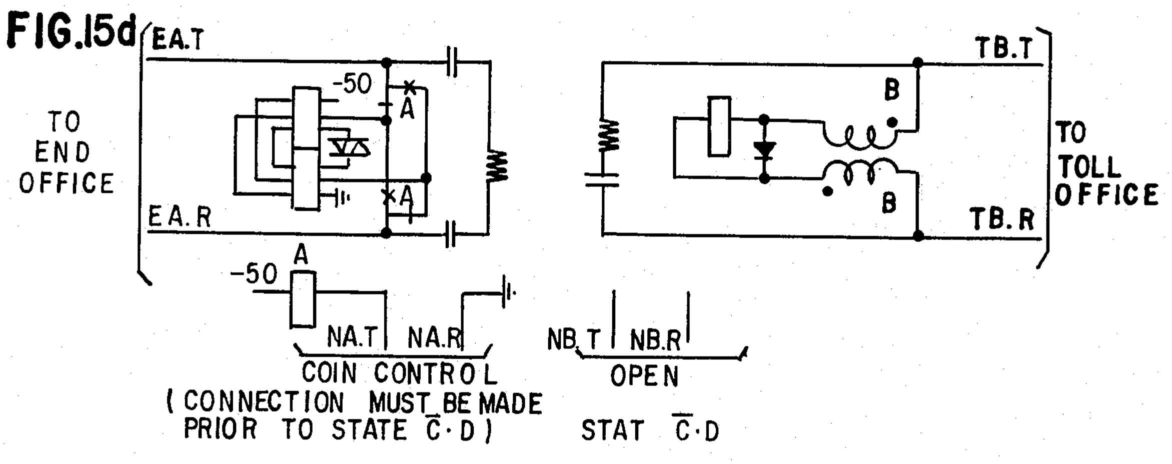

State $\overline{\text{C}}$.D (FIG. 15*d*)

a. In this state:

1. Both the EA and TB appearances are terminated.

2. The NB appearance is disconnected from the circuit.

3. The A relay is connected via the NA appearance and the network to a coin control matrix point in either the multifrequency sender or operator's position trunk circuit. In this state, relay A is under the control of a coin control matrix point rather than the trunk highway.

b. This state is used for sending toward the end office the following signals which are in the form of a series of on-hook winks:

1. Operator reattached: 2 winks.

2. Coil collect: 3 winks.

3. Coin return: 4 winks.

4. Ringback: 5 winks.

Notes: Prior to sending wink signals:

1. Set circuit to state C.D.

2. Then connect a coin control matrix point via the network to the NA appearance.

3. Then close the contacts of the coin control matrix point.

4. Then set circuit to state $\overline{\text{C}}$.D.

After sending wink signals:

1. Set circuit to state C.D.

2. Then disconnect the coin control matrix point from this circuit.

This sequence guards against false release of the A relay.

Two-Wire Delayed Call Trunk Circuit

A schematic circuit diagram of the two-wire delayed call trunk circuit is shown in FIG. 5.

Sense Matrix Interface

The delayed call trunk circuit contains sense points SA and SB, via relay contacts RA-1 and RB-1, respectively. For sense point SA, closed contacts RA-1 indicate an off-hook condition from the calling end toll office (TA appearance of the trunk circuit) provided that relay A is operated. For sense point SB, closed contacts indicate an off-hook condition from the called end toll office (TB appearance of the trunk circuit) provided that relay B is operated.

Control Matrix Interface

The delayed call trunk circuit contains relays RA and RB and control relays A, B, C, D and E which are controlled by the control matrix via the trunk highway (paths CAS–CES) and relay S which is controlled by a dedicated control matrix point via path C55.

Relay S connects this circuit to the trunk highway. Relay A extends on-hook, off-hook supervision toward the calling end toll office. Relay B extends on-hook, off-hook supervision toward the called end toll office. Relays C, D and E provides five control states for the two-wire delayed call trunk circuit. Three additional states are not used.

Figure 16A:
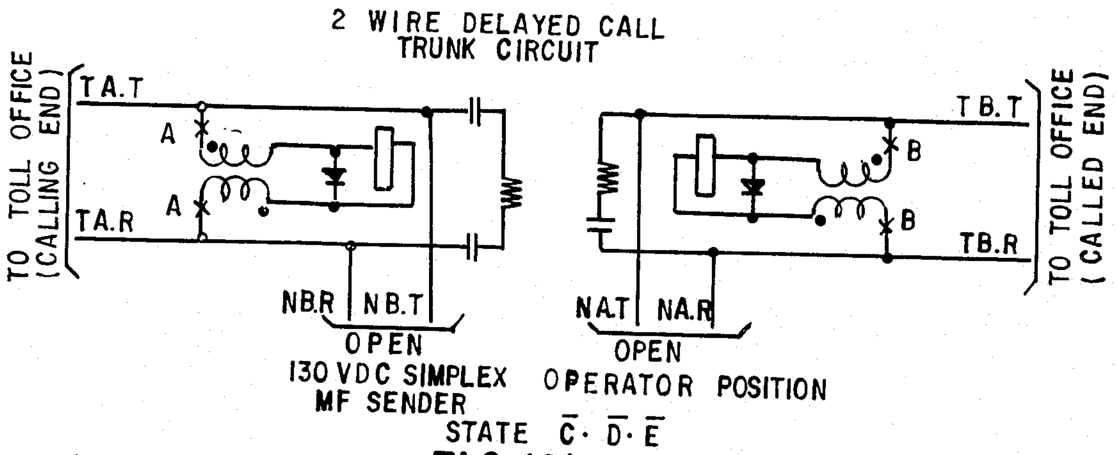
FIGS. 16*a*–16*e* illustrate control states for the delayed call trunk circuits.

State $\overline{\text{C}}$.$\overline{\text{D}}$.$\overline{\text{E}}$ (FIG. 16*a*)

a. In this state:

1. Both the TA and TB appearances are terminated.

2. The TA appearance is connected to the network appearance NB.

3. The TB appearance is connected to the network appearance NA.

b. Typical uses of this state:

1. $\overline{\text{A}}$.$\overline{\text{B}}$.

A. Idle.

B. Connection of an operator's position trunk circuit via the NA multifrequency appearance.

C. Connection of a multifrequency sender via the appearance NB, multifrequency pulsing is to occur in state C.$\overline{\text{D}}$.$\overline{\text{E}}$.

D. Toll line release (calling end).

2. A.B

A. Connection of a multifrequency receiver to the NB appearance for sending +130 volt DC simplex rering pulses to a cord board if the toll office is No. 4 crossbar or XBT.

B. Connection of an operator's position trunk circuit via the NA appearance.

Figure 16B:
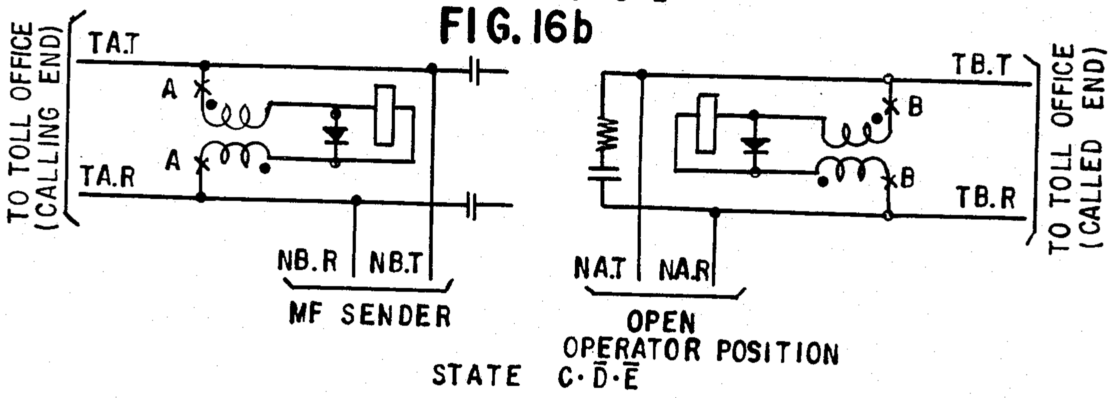
Figure 16C:
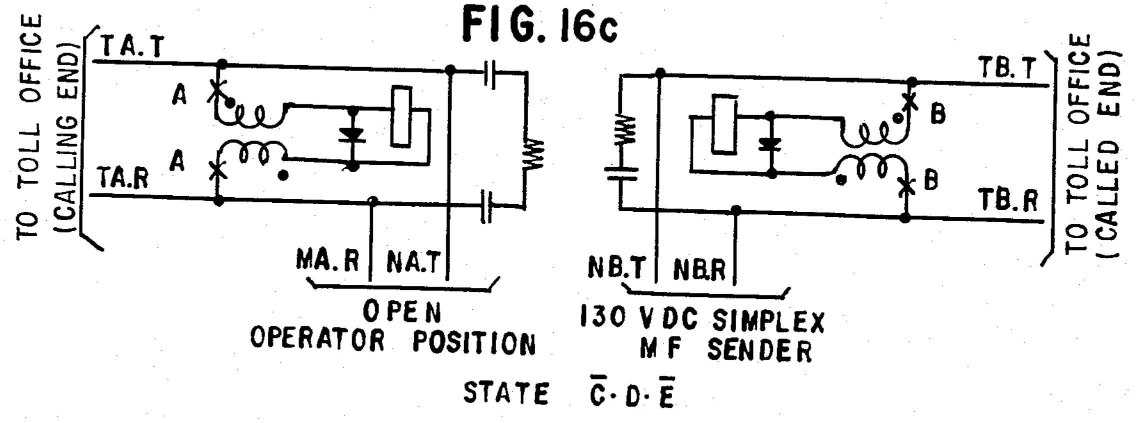

State C.$\overline{\text{D}}$.$\overline{\text{E}}$. (FIG. 16*b*)

a. In this state:

1. The TA appearance is terminated by a multifrequency sender connected to the NB appearance.

2. The TB appearance is terminated.

3. The TA appearance is connected to the NB appearance.

4. The TB appearance is connected to the NA appearance.

b. Typical uses of this state:

1. A.B

A. Seizure of the calling end toll office incoming trunk circuit.

B. Multifrequency pulsing of the calling number.

Notes:

1. Connect the multifrequency sender to the NB appearance in state $\overline{A}.\overline{B}.\overline{C}.\overline{D}.\overline{E}$.

2. Then set this circuit to state $\overline{A}.\overline{B}.\overline{C}.\overline{D}.\overline{E}$ to seize the toll office incoming trunk circuit.

3. Then send the calling number after a start dial is received from the toll office (contacts SA changes from off-hook to on-hook).

4. Then set this circuit to the desired state.

5. Then disconnect the multifrequency sender.

This sequence maintains a constant idle line termination on the TA appearance.

C. Connection maintained to the operator via the NA appearance.

State $\overline{C}$.D.$\overline{E}$ a. In this state:

1. Both the TA and TB appearances are terminated.

2. The TA appearance is connected to the NA appearance.

3. The TB appearance is connected to the NB appearance.

b. Typical uses of this state:

1. A.$\overline{B}$.

A. Connection of a multifrequency sender via the NB appearance. Multifrequency pulsing is to occur in state A.B.$\overline{C}$.D.E.

B. Toll line release (called end).

2. A.B

A. Connection of a multifrequency receiver to the NB appearance for sending +130 volt simplex rering pulses to a cord board if the toll office is No. 4 crossbar or XBT.

B. Connection of an operator's position trunk circuit via the NA appearance.

Figure 16D:
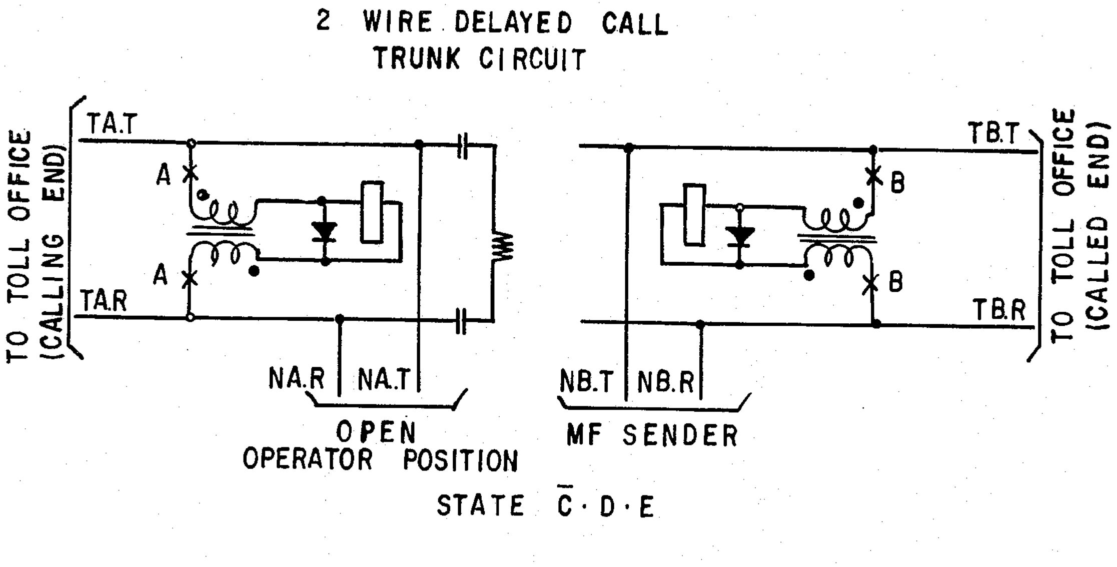
Figure 16E:
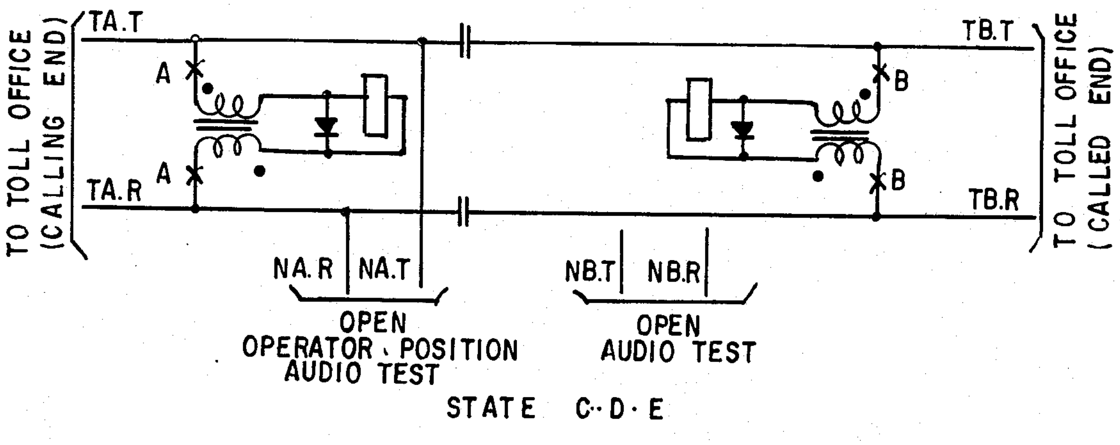

State $\overline{C}$.D.E (FIG. 16*d*)

a. In this state:

1. The TA appearance is terminated.

2. The TB appearance is terminated by a multifrequency sender connected to the NB appearance.

3. The TA appearance is connected to the NA appearance.

4. The TB appearance is connected to the NB appearance.

b. Typical uses of this state:

1. A.B.

A. Seizure of the called end toll office incoming trunk circuit.

B. Multifrequency pulsing of the called number.

Notes:

1. Connect the multifrequency sender to the NB appearance in state A.$\overline{B}$.$\overline{C}$.D.$\overline{E}$.

2. Then set this circuit to state A.B.$\overline{C}$.D.E. to seize the toll office incoming trunk circuit.

3. Then send the called number after a start dial signal is received from the toll office (SB changes from off-hook to on-hook).

4. Then set this circuit to the desired state.

5. Then disconnect the multifrequency sender.

This sequence maintains a constant idle line termination on the TB appearance.

C. Connection maintained between the operator and the calling subscriber via the NA appearance.

State C.D.E a. In this state:

1. The TA appearance is switched through to the TB appearance.

2. Both idle line terminations are removed.

3. The NA appearance bridges the transmission path between the TA and TB appearances.

4. The NB appearance is disconnected from the circuit to reduce capacitive bridging losses.

b. Typical uses of this state:

1. A.$\overline{B}$.

A. Switch-through from the calling subscriber to the called station.

B. Answer.

C. Bridging of the operator on the connection between the calling and called subscribers via the NA appearance.

2. A.$\overline{B}$.

A. Rering via the TB appearance to a toll office not requiring DC simplex rering.

B. Connection maintained between the calling subscriber and the operator via the NA appearance.

3. $\overline{A}$.B

A. Rering via the TA appearance to a toll office not requiring DC simplex rering.

B. Connection maintained between the calling subscriber and the operator via the NA appearance.

4. $\overline{A}$.$\overline{B}$.

Audio test.

Notes: 1. The NB appearance is open circuited in the trunk circuit. 2. The NA appearance has normal battery provided by the battery feed relay in the toll office incoming trunk circuit.

Four-wire Access Trunk Circuit

Referring to FIG. 6, four-wire access trunk circuits are used when there is both a four-wire trunk facility between the end office and the TSPS system and a four-wire switching machine at the toll office. Repeater circuit is associated with the trunk circuit. A hybrid network is included in the repeater to provide a two-wire talking path through the switching network for the operator.

Sense Matrix Interface

Each access trunk circuit contains sense points SA and SB, via relay contacts EA-1 and RB-1, respectively. For sense point SA, closed EA-1 contacts indicate an off-hook condition from the end office (EA appearance of the trunk circuit). For sense point SB, closed contacts RB-1 indicate an off-hook condition from the toll office (TB and TD appearances of the trunk circuit) provided that relay B is operated.

Control Matrix Interface

Each access trunk circuit contains relays EA and RB and control relays A, B, C and D which are controlled by the control matrix via the trunk highway (paths CA-S–CDS) and relay S which is controlled by a dedicated control matrix point via path CSS.

Relay S connects this circuit to the trunk highway. Relay A extends on-hook, off-hook supervision toward the end office. Note that in state C.D, relay A is under control of a coin control matrix point instead of the trunk highway. Relay B extends on-hook, off-hook supervision toward the toll office. Relays C and D provide four control states for the four-wire access trunk circuit.

Figure 17A:
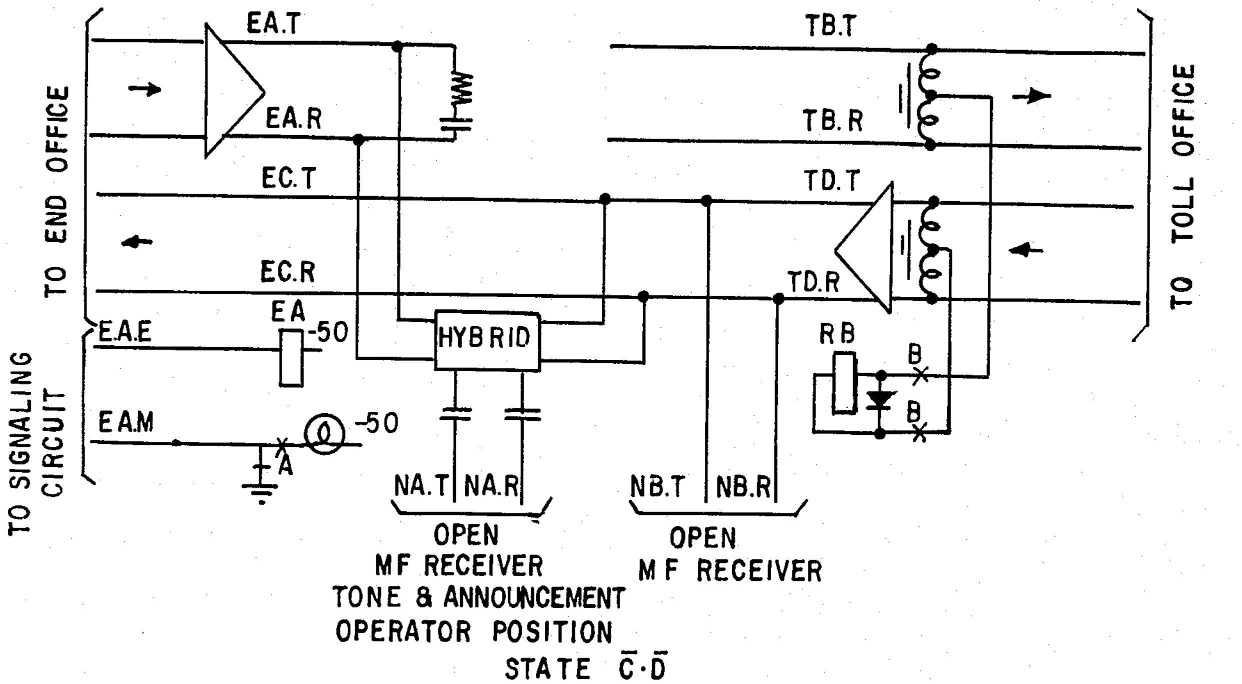
FIGS. 17*a*–17*d* illustrate control states for the four-wire access trunk circuit.

State $\bar{C}.\bar{D}$ (FIG. 17*a*)

a. In this state:

1. The EA appearance is terminated.

2. The EC appearance end office to the system TSPS is switched through to the TD appearance. 3. The TD appearance is connected to the NB appearance.

b. Typical uses of this state:

1. $\bar{A}.\bar{B}$.

A. Idle.

B. Called number reception via:

- Dial pulsing

2. $A.\bar{B}$.

A. Delay dial.

B. CLR hold.

C. Reception of the calling number by a multifrequency receiver connected to the NA appearance.

D. Transmission of reorder tone, audible ring or recorded announcement of the calling subscriber from a tone and announcement circuit connected to the NA appearance.

E. Connection between the calling subscriber and an operator's position trunk circuit via the NA appearance.

F. Busy back to the end office.

G. Toll line release.

3. A.B.

Connection of an MF receiver to the NB appearance for receiving inband coin control signals from a cord board.

Figure 17B:
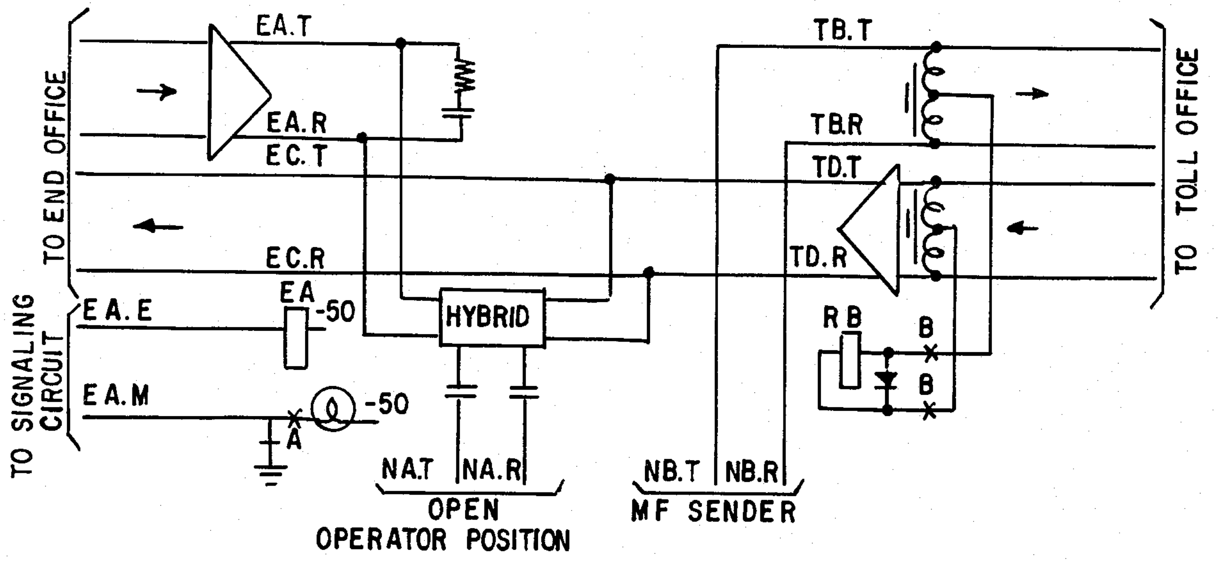

State $C.\bar{D}$ (FIG. 17*b*)

a. In this state:

1. The EA appearance is terminated.

2. The EC appearance is switched through to the TD appearance.

3. The TB appearance is connected to the NB appearance.

b. Typical uses of this state:

1. A.B.

A. Seizure of the toll office incoming trunk circuit.

B. Multifrequency pulsing of the called number.

C. Connection maintained between the calling subscriber and an operator via the NA appearance.

2. $A.\bar{B}$.

A. Toll line release prior to end of multifrequency pulsing.

B. Connection maintained between the multifrequency sender and the toll office.

C. Connection maintained between the operator and calling subscriber.

Figure 17C:
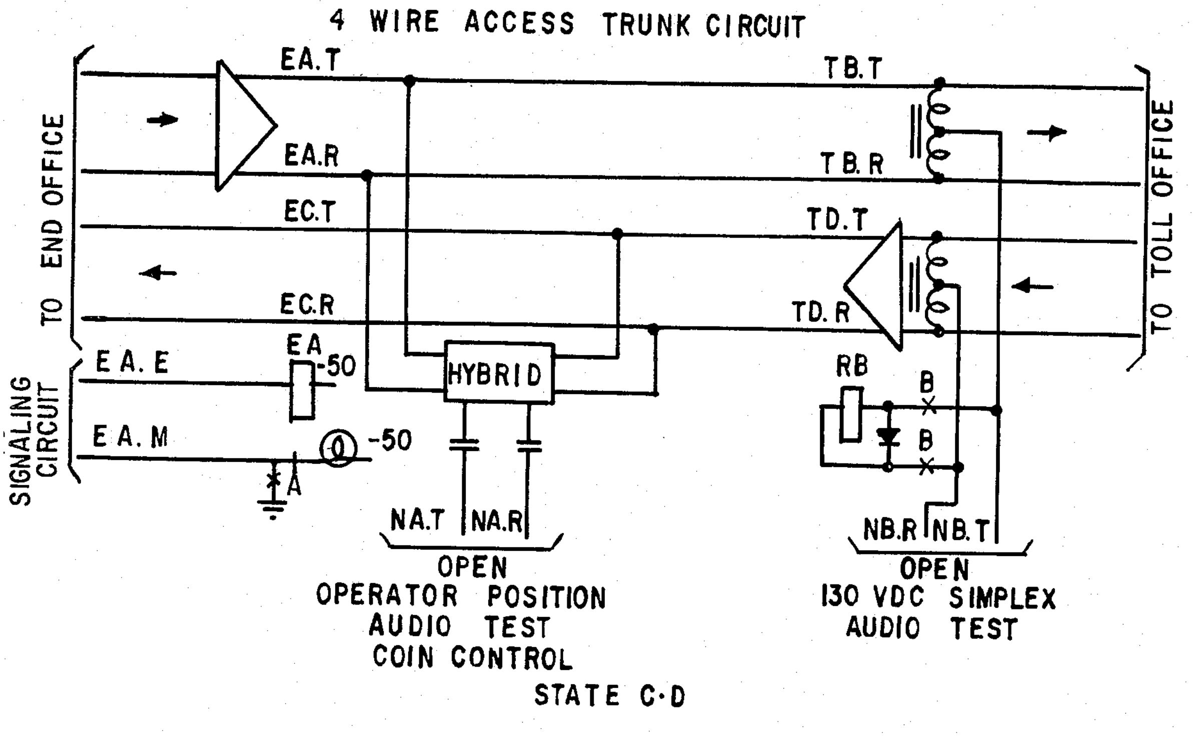

State C.D (FIG. 17*c*)

a. In this state:

1. The EA appearance is switched through to the TB appearance. 2. The EC appearance is switched through to the TD appearance.

3. The NB appearance is connected to the midpoint of the retard coils across the TB and TD appearances.

b. Typical uses of this state:

1. A.B.

A. Switch-through from the calling subscriber to the called station.

B. Answer.

C. Bridging of the operator on the connection between the calling and called subscribers via the NA appearance.

D. Connection of an MF receiver to the NB appearance for sending +130 volt DC rering pulses to a cord board if the toll office is No. 4 crossbar or XBT.

2. A.B.

A. Rering forward to a toll office not requiring DC simplex rering.

B. Connection maintained between the calling subscriber and the operator via the NA appearance.

C. Audio test.

NOTES:

1. The NB appearance has normal battery provided by the toll office incoming trunk circuit.

2. The NA appearance is capacitively coupled to the hybrid.

3. Busy back to the end office is provided during the audio test.

Figure 17D:
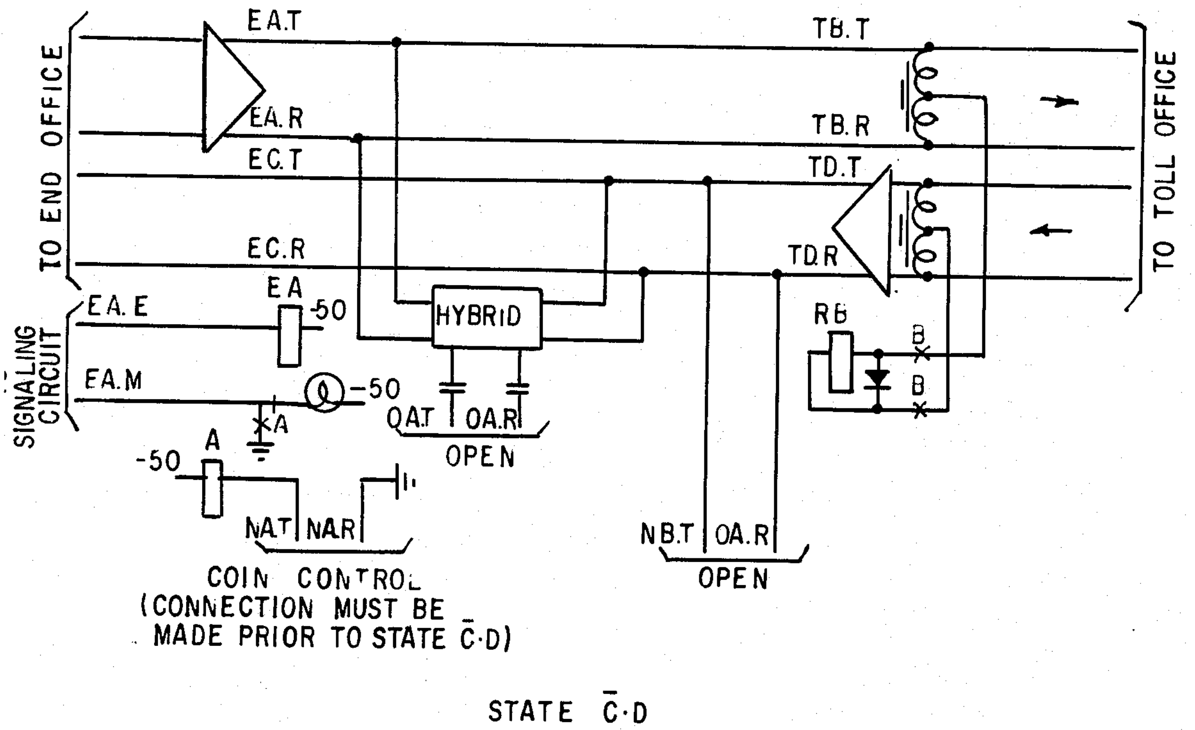

State $\bar{C}.D$ (FIG. 17*d*)

a. In this state:

1. The EA appearance is switched through to the TB appearance.

2. The EC appearance is switched through to the TD appearance.

3. The NB appearance is conencted to the TD appearance.

4. The OA appearance of the hybrid is disconnected from the trunk circuit.

5. The A relay is connected via the NA appearance and the network to a coin control matrix point in either the MF sender or operator's position trunk circuit.

b. This state is used for sending toward the end office the following signals which are in the form of a series of on-hook winks 1. Operator reattached: 2 winks.

2. Coin collect: 3 winks.

3. Coin return: 4 winks.

4. Ringback: 5 winks.

Notes:

Prior to sending wink signals:

1. Set circuit to state C.D.

2. Then connect a coin control matrix point via the network to the NA appearance.

3. Then close the contacts of the coin control matrix point.

4. Then set circuit to state $\bar{C}.D$.

After sending wink signals:

1.Set circuit to state C.D.

2. Then disconnect the coin control matrix point from this circuit.

This sequence guards against false release of the A relay.

Four-Wire Delayed Call Trunk Circuit

Referring to FIG. 18, four-wire delayed call trunk circuits are used when both ends are terminated on a four wire switching machine at the toll office. A network repeated is associated with the trunk circuit. A network hybrid is included in the repeater to provide a two wire talking path through the switching network for the operator.

Sense Matrix Interface

The delayed call trunk circuit contains sense points SA and SB, via relay contacts RA-1 and RB-1, respectively. For sense point SA, closed contacts RA-1 indicate an off-hook condition from the calling end toll office (TA and TC appearances of the trunk circuit) provided that relay A is operated. For sense point SB, closed contacts RB-1 indicate an off-hook condition from the called end toll office (TB and TD appearances of the trunk circuit) provided that relay B is oeprated.

Control Matrix Interface

The delayed call trunk circuit contains relays RA and RB and control relays A, B, C, D and E which are controlled by the control matrix via the trunk highway (paths CAS-CES) relay S which is controlled by a dedicated control matrix point via path C55.

Relay S connects this circuit to the trunk highway. Relay A extends on-hook, off-hook supervision toward the calling end toll office. Relay B extends on-hook, off-hook supervision toward the called end toll office. Relays C, D and E provide five control states for the four-wire delayed call trunk circuit. Three additional states are not used.

Figure 18A:
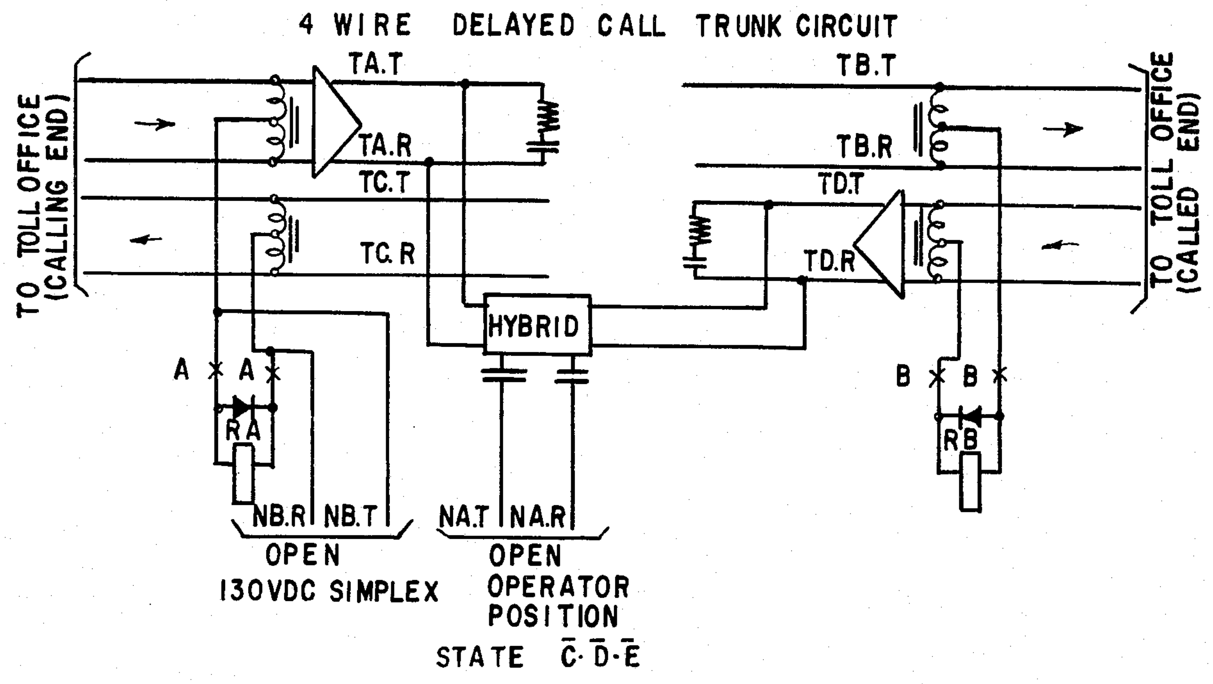
FIGS. 18*a*–18*e* illustrate control states for the four-wire delayed call trunk circuits.

State $\bar{C}.\bar{D}.\bar{E}$. (FIG. 18*a*)

1. The TA and TD appearances are terminated.
2. The NB appearance is connected to the midpoints of the retard coils across the TA and TC appearances.

b. Typical uses of this state:

1. $\bar{A}.\bar{B}$.

A. Idle.

B. Connection of an operator's position trunk circuit via the NA appearance.

2. A.B.

A. Connection of an MF receiver to the NB appearance for sending +130 volt DC simplex rering pulses to a cord board if the toll office is No. 4 crossbar or XBT.

B. Connection of an operator's position trunk circuit via the NA appearance.

Figure 18B:
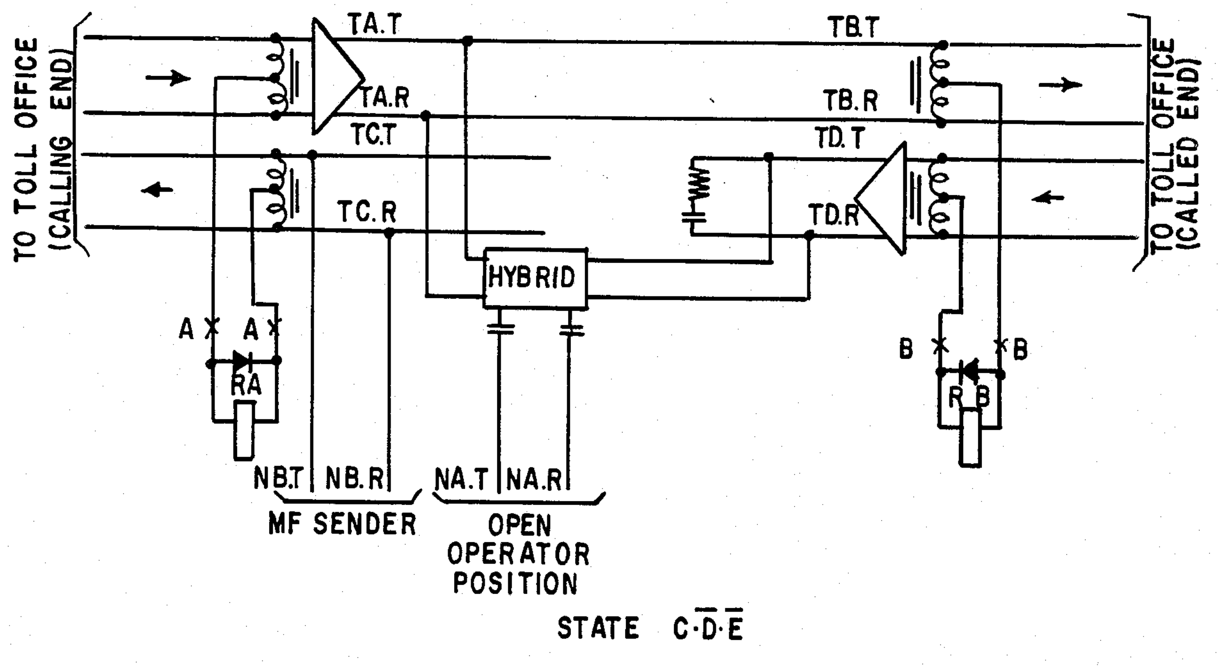

State $C.\bar{D}.\bar{E}$ (FIG. 18*b*)

a. In this state:

1. The TA appearance is switched through to the TB appearance.
2. The TD appearance is terminated.
3. The TC appearance is connected to the NB appearance.

b. Typical uses of this state:

1. A.B.

A. Seizure of the calling end toll office incoming trunk circuit.

B. Multifrequency pulsing of the calling number.

C. Connection maintained to the operator via the NA appearance.

Figure 18C:
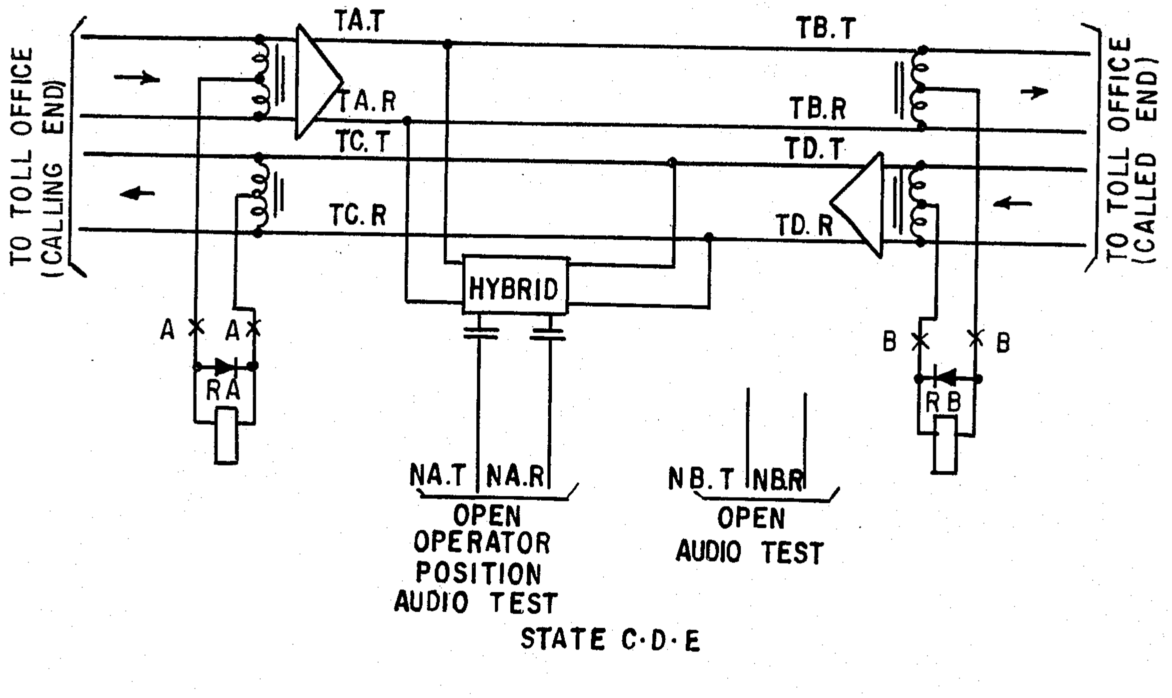

State $\bar{C}.D.\bar{E}$ (FIG. 18*c*)

a. In this state:

1. The TA appearance is terminated.
2. The TC appearance is switched through to the TD appearance.
3. The NB appearance is connected to the midpoints of the retard coils across the TB and TD appearances.

b. Typical uses of this state:

1. A.B.

A. Connection of a multifrequency receiver to the NB appearance for sending +130 volt simplex rering pulses to a cord board if the toll office is No. 4 crossbar or XBT.

B. Connection of an operator's position trunk circuit via the NA appearance.

Figure 18D:
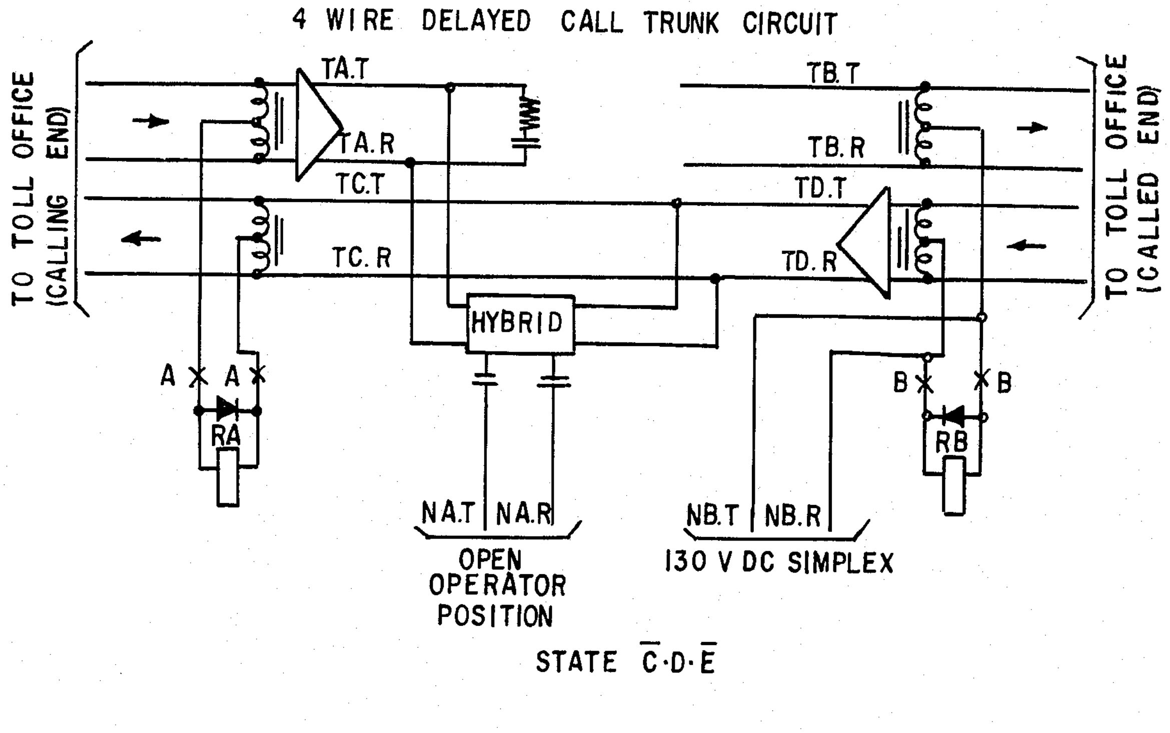

State $\bar{C}.D.E$ (FIG. 18*d*)

a. In this state:

1. The TA appearance is terminated.
2. The TC appearance is switched through to the TD appearance.
3. The TB appearance is connected to the NB appearance.

b. Typical uses of this state:

1. A.B.

A. Seizure of the called end toll office incoming trunk circuit.

B. Multifrequency pulsing of the called number.

C. Connection maintained between the operator and the calling subscriber via the NA appearance.

Figure 18E:
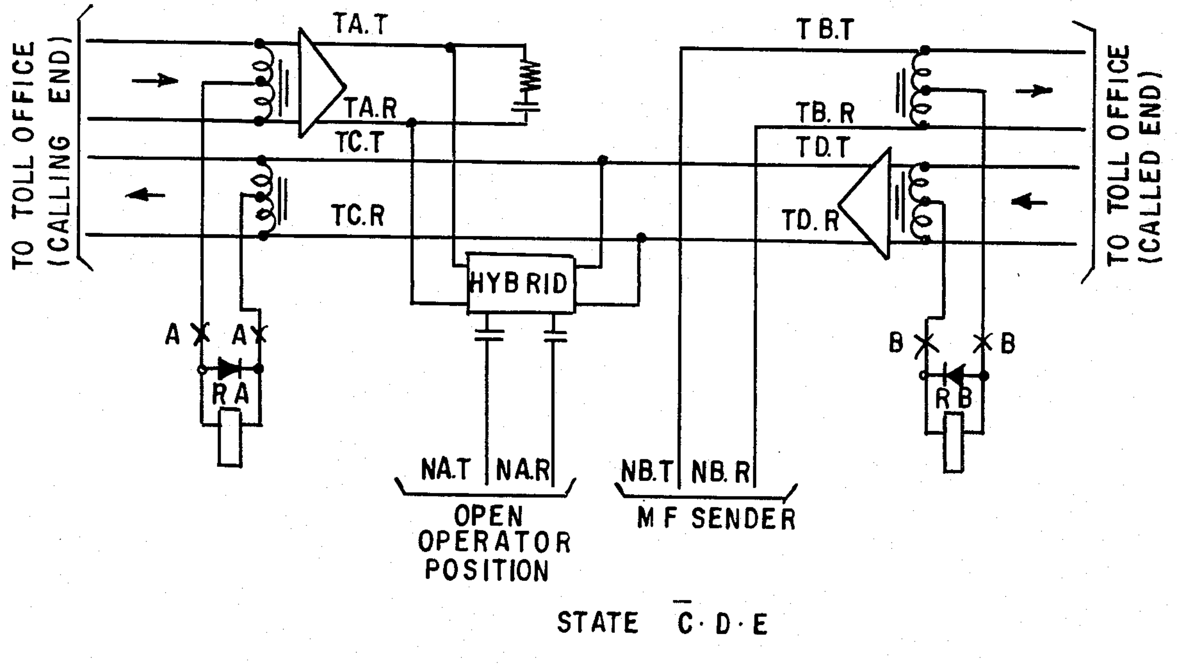

State C.D.E (FIG. 18*e*)

a. In this state:

1. The TA appearance is switched through to the TB appearance.
2. The TC appearance is switched through to the TD appearance.
3. The NB appearance is disconnected from the circuit to reduce capacitive bridging losses.

b. Typical uses of this state:

1 A.B.

A. Switch-through from the calling subscriber to the called station.

B. Answer.

C. Bridging of the operator on the connection between the calling and called subscribers via the NA appearance.

2. $A.\bar{B}$.

A. Rering via the TB and TD appearances to a toll office not requiring DC simplex rering.

B. Connection maintained to the oeprator via the NA appearance.

3. $\bar{A}.B$.

A. Rering via the TA and TC appearances to a toll office not requiring DC simplex rering.

B. Connection maintained to the operator via the NA appearance.

4. $\bar{A}.\bar{B}$.

Audio test.

Notes:

1. The NB appearance is open circuited in the trunk circuit.
2. The NA appearance has blocking capacitors in the hydrid.

Operator Service Trunnk Circuit

Referring to FIG. 8, the operator service trunk circuit is used for bridging an assistant operator on a connection via a two-wire facility and the second position trunk appearance. This circuit contains an impedance matching network to provide about 6400 ohms input impedance as seen from the network appearance and 900 ohms impedance to the trunk facility. A. 900 ohm two-wire hybrim repeater is associated with the operator service trunk to compensate for the coupling loss of the circuit.

Sense Matrix Interface

The operator service trunk circuit contains one sense point SB via relay contacts RB-1. For sense point SB, closed contacts RB-1 indicates an off-hook condition from the switchboard (RB appearance of the trunk circuit) provided that relay B is operated..

Control Matrix Interface

The operator service trunk circuit contains line relay RB and control relays B and C which are controlled by the control matrix via the trunk highway via paths CBS and CCS and relay S which is controlled by a dedicated control matrix point over path C55.

Relay S connects this circuit to the trunk highway. Relay B extends on-hook, off-hook supervision toward the switchboard trunk circuit. Relays B and C provide four control states for the operator service trunk circuit.

Figure 19A:
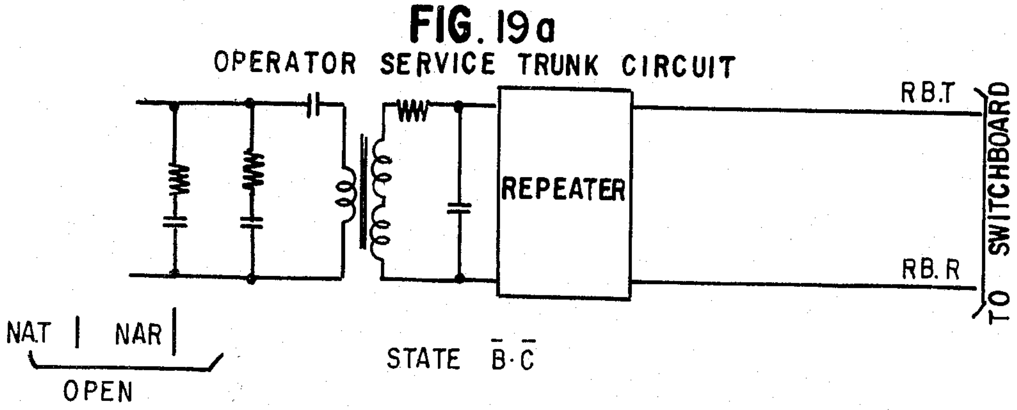
FIGS. 19*a*–19*d* illustrate control states for the operator service trunk circuits; and, FIGS. 20*a*–20*d* illustrate control states for the operator number identification trunk circuits.

State $\bar{B}.\bar{C}$ (FIG. 19*a*)

a. In this state:

The NA appearance is disconnected from the circuit.

b. Typical use of this state:

Idle.

Figure 19B:
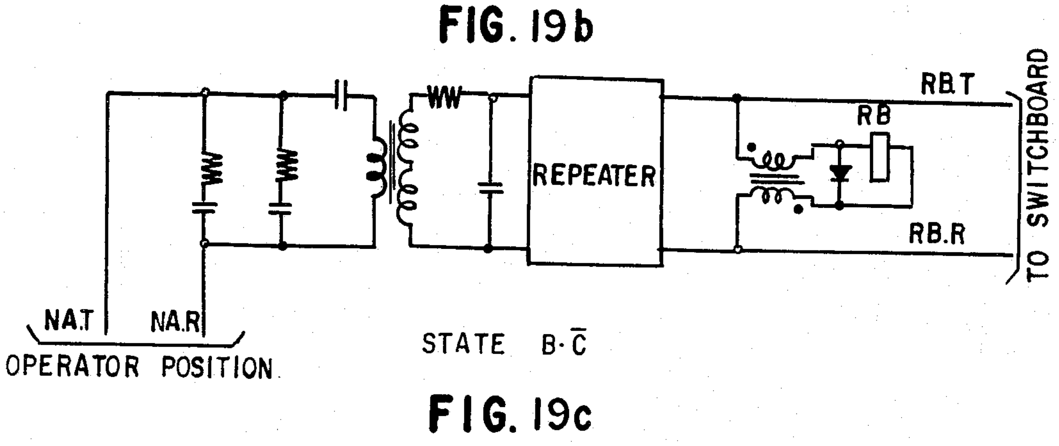

State B.$\overline{C}$ (FIG. 19*b*)

a. In this state:

1. The NA appearance is switched through to the RB appearance.

2. The NA appearance is terminated.

b. Typical uses of this state:

1. Seizure of the switchboard trunk circuit.

2. Answer.

3. Connection between the operator's position trunk circuit and the switchboard trunk circuit.

Figure 19C:
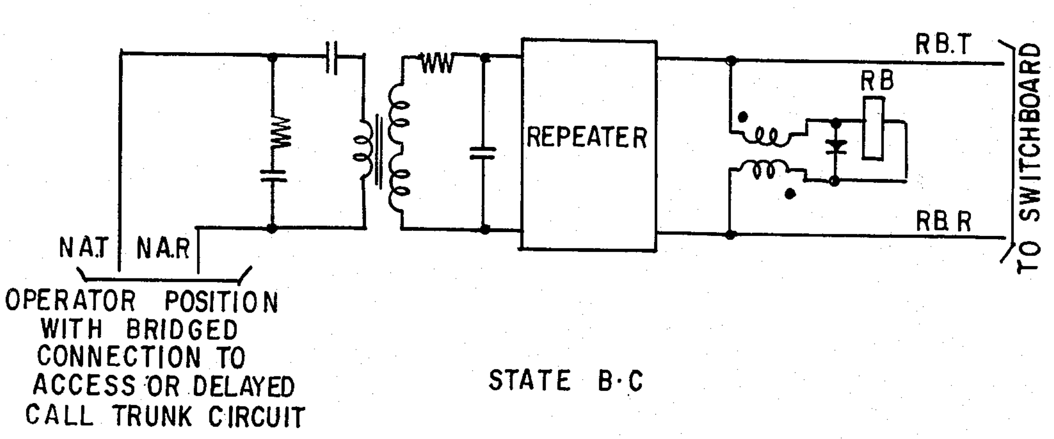
Figure 19D:
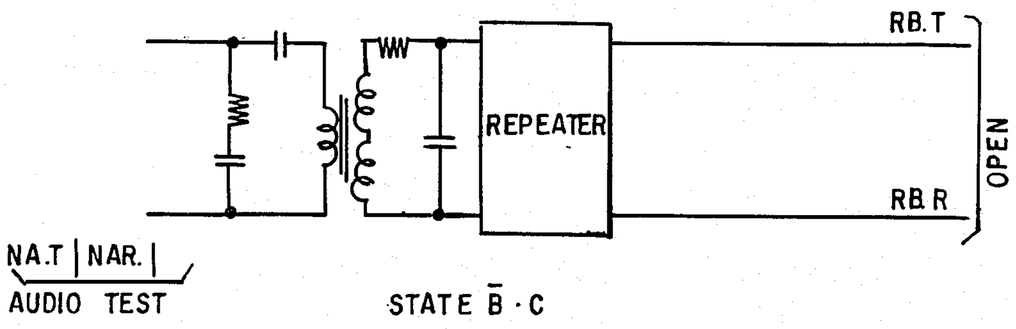

State B.C (FIG. 19*c*)

a. In this state:

1. The NA appearance is switched through to the RB appearance.

2. The termination is removed.

b. Typical uses of this state:

1. Seizure of the switchboard trunk circuit.

2. Answer.

3. Connection between the operator's position trunk circuit and the switchboard trunk circuit. In addition, an access trunk circuit or delayed call trunk circuit is bridged on the connection at the position trunk circuit.

State $\overline{B}$.C (FIKG. 19*d*)

a. In this state:

The NA appearance is disconnected from the circuit.

b. Typical use of this state:

1. Position release.

2. Audio test.

ONI Trunk Circuit

One example of an ONI trunk, circuit is shown in FIG. 9.

Sense Matrix Interface

The ONI trunk circuit contains sense points SA and SB, via relay contacts EA-1 and EC-1, respectively. For sense point SA, closed contact EA-1 indicates condition from the ticketing office (TA appearance of the ONI trunk circuit) when relay B is unoperated and indicates the detection of busy tone from the ticketing office (TA appearance of the ONI trunk circuit) when relay B is operated.

For sense point SB, closed contacts EC-1 indicate an off-hook condition from the ticketing office (TA appearance of the trunk circuit).

Control Matrix Interface

The ONI trunk circuit contains relays EA, EC and TN relays A, B, C and D which are controlled by the control matrix via the trunk highway (paths CAS, CBS and CCS) and relay S which is controlled by a dedicated control matrix point via path CSS.

Relay S connects this circuit to the trunk highway. Relay A extends on-hook, off-hook supervision toward the TA ticketing office appearance. Relay C extends on-hook, off-hook supervision toward the TC ticketing office appearance. Relays A, B and C provide four control states for the trunk circuit. Four additional states are not used.

Figure 20A:
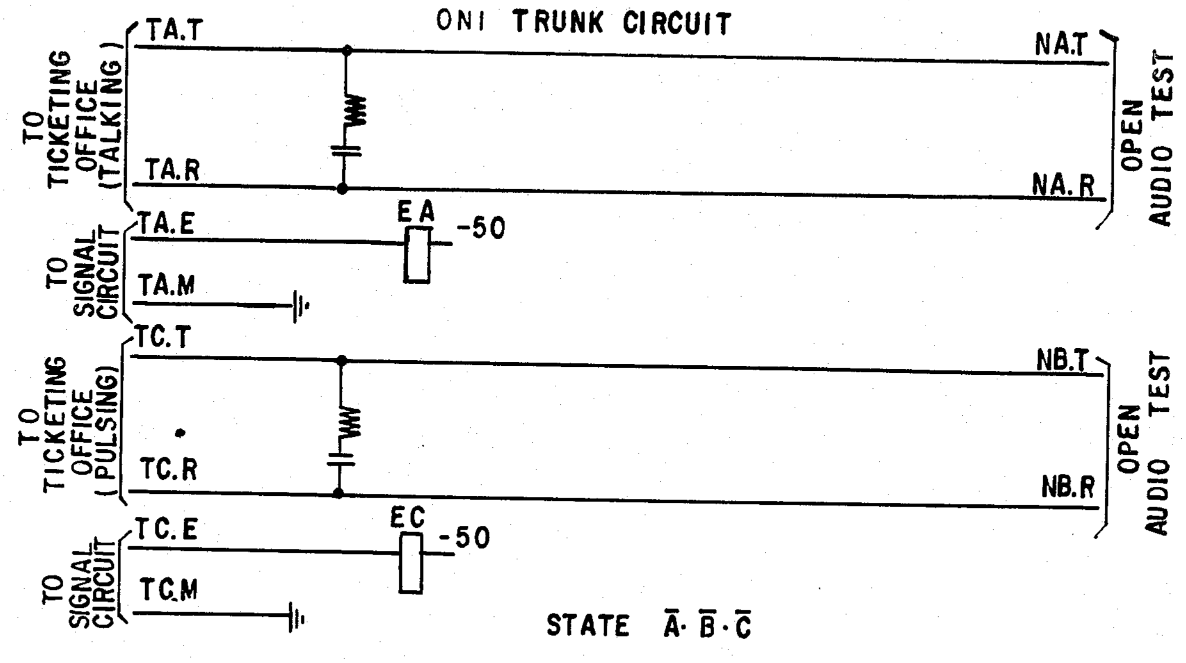

State $\overline{A}$.$\overline{B}$.$\overline{C}$ (FIG. 20*a*)

a. In this state:

1. Both the TA and TC appearances are terminated.

2. The NA appearance is connected to the TA appearance.

3. The NB appearance is connected to the TC appearance.

b. Typical uses of this state:

1. Make busy (this circuit is not available for SATT or CAMA traffic).

2. Position disconnect.

3. Audio test.

Notes:

A. The NA and NB appearances are capacitively coupled to the trunk.

B. Make busy to the ticketing office is provided during the audio test.

Figure 20B:
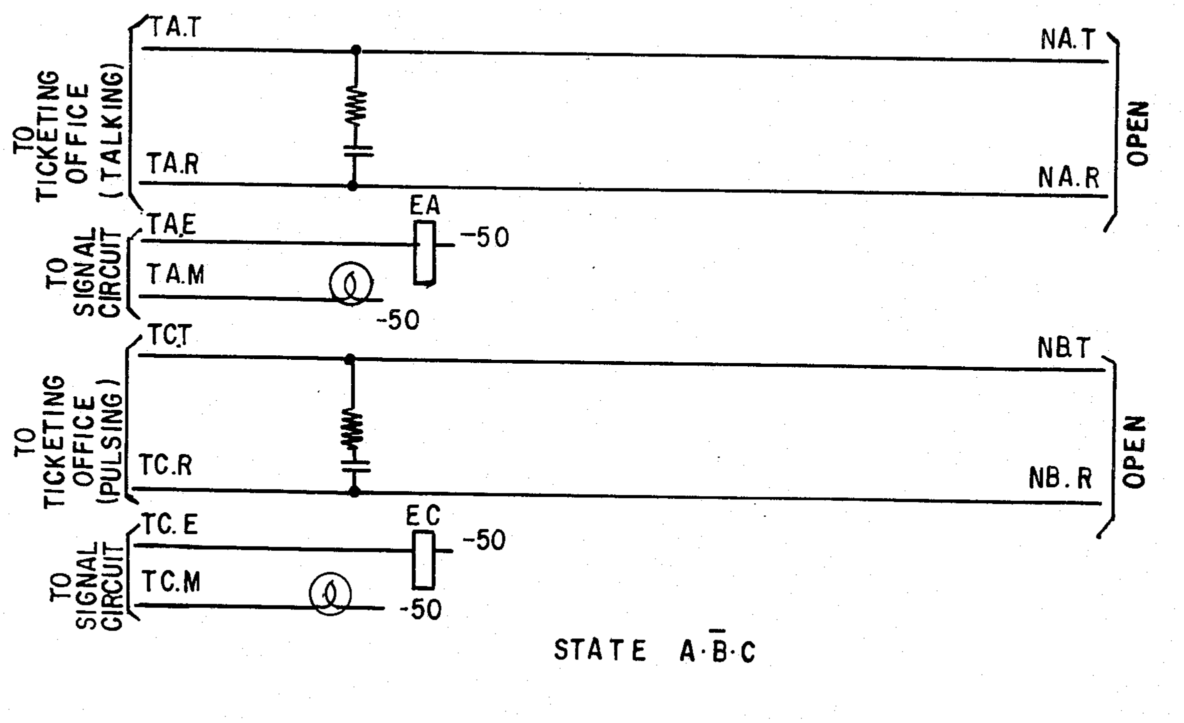

State A.$\overline{B}$.C (FIG. 20*b*)

a. In this state:

1. Both the TA and TC appearances are terminated.

2. The NA appearance is connected to the TA appearance.

3. The NB appearance is connected to the TC appearance.

b. Typical uses of this state:

1. $\overline{SA}$.$\overline{SB}$

Position available (ready to receive SATT or CAMA traffic).

2. $\overline{SA}$.$\overline{SB}$

Seizure for ticketing office.

Figure 20C:
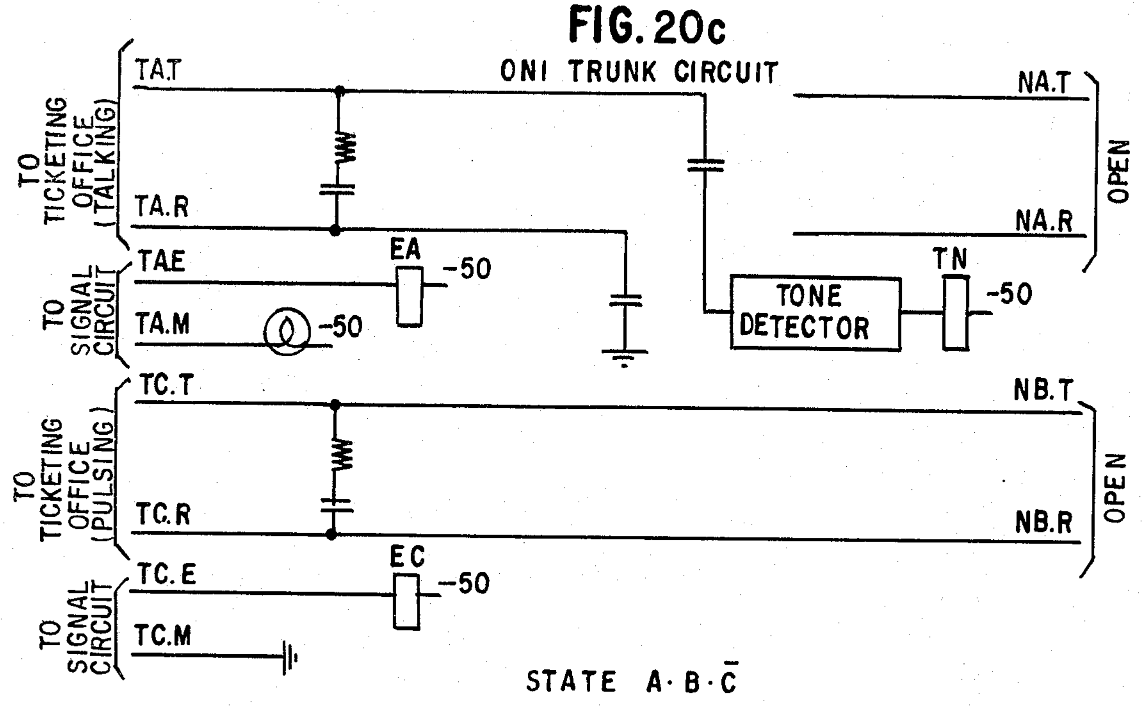

State A.B.$\overline{C}$ (FIG. 20*c*)

a. In this state:

1. Both the TA and TC appearances are terminated.

2. The TA appearance is connected to the busy tone detector.

3. The NA appearance is disconnected from the circuit.

4. The NB appearance is connected to the TC appearance.

b. Typical uses of this state:

1. $\overline{SA}$.SB

No detection of busy tone.

2. SA.SB

Detection of busy tone.

- Single order tone — ANI failure.

- Double order tone — ONI.

Figure 20D:
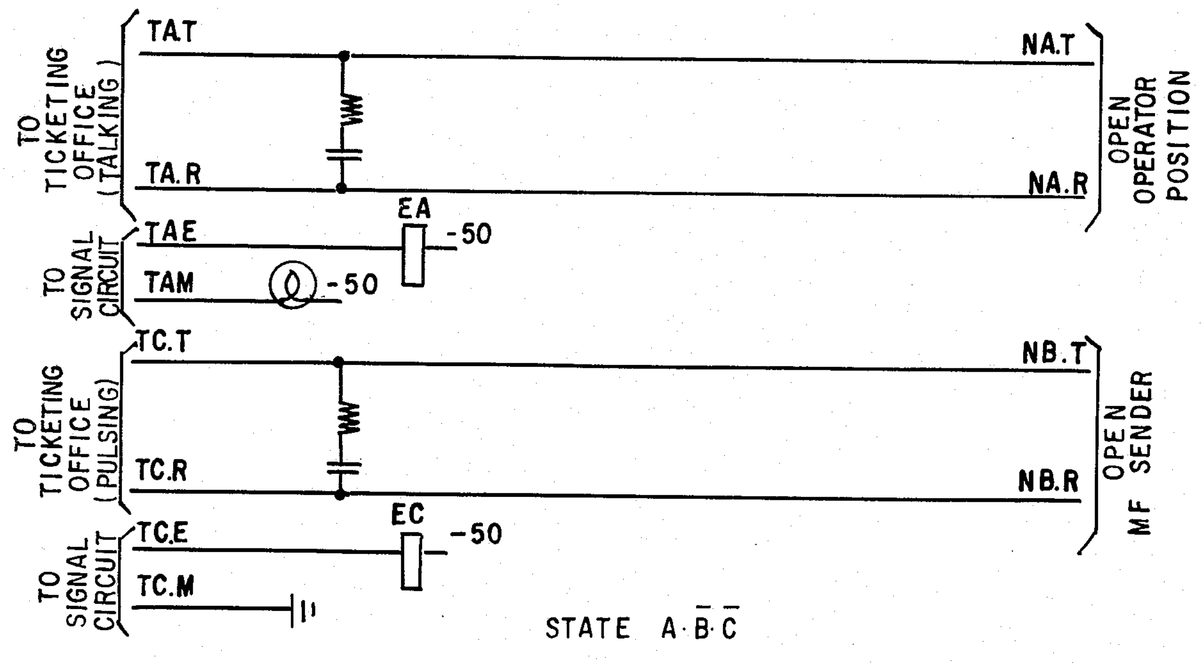

State A.B.C (FIG. 20*d*)

a. In this state:

1. The TA appearance is terminated.

2. The TC appearance is terminated if relay EA is not operated.

3. The NA appearance is connected to the TA appearance.

4. The NB appearance is connected to the TC appearance.

b. Typical uses of this state:

1. SA.SB

Challenging the calling subscriber and keying the calling number by the TSPS operator.

MF pulsing of the calling number.

2. $\overline{SA}$.SB

Reorder from the ticketing office.

3. $\overline{SA}$.$\overline{SB}$

Release from the ticketing office.

We claim:

1. In a communication switching system including a switching network having a plurality of inlets and a plurality of outlets, a plurality of trunk circuits adapted to request the service of common control means for causing the establishment of paths through the switching network from the trunk circuits to predetermined outlets of said switching network, a trunk control arrangement comprising highway control means controlled by said common control means to activate a least one trunk circuit highway for providing control signals to a group of said trunk circuits over a plurality of paths common to the trunk circuits of said group and select means controlled by said common control means for effecting the connection of a preselected trunk circuit of said group to the trunk control highway to receive said control signals.

2. In a communication switching system including a switching network having a plurality of inlets and a plurality of outlets, a plurality of trunk circuits adapted to request the service of common control means for causing the establishment of paths through the switching network from the trunk circuits to predetermined outlets of said switching network, a trunk control arrangement comprising highway control means controlled by said common control means to enable first and second trunk circuit control highways for providing control signals for a group of said trunk circuits over separate path sets, highway transfer means for setting a first one of said trunk control highways to an active state and the other of said trunk control highways to a standby state, and select means controlled by said common control means for effecting the connection of a preselected trunk circuit of said group to the path set of one trunk control highway to receive said control signals.

3. A system as set forth in Claim 2 wherein said highway transfer means includes fault detecting means for monitoring the operation of said highway control means and for providing a fault indication to said common control in the event of a fault in said highway control means, said highway transfer means including switching means responsive to a control signal provided by said common control to set said one trunk control highway to an active state to enable said control signals to be extended to said trunk circuits over the path set of said other trunk control highway.

4. In a communication switching system including a switching network having a plurality of inlets and a plurality of outlets, a plurality of groups of trunk circuits, the trunk circuits of each group being adapted to request the service of common control means for causing the establishment of paths through the network from the trunk circuits to predetermined outlets of said switching network, each of said trunk circuits including a plurality of control switching means selectively operable to establish a plurality of different control states for said trunk circuit, each of said trunk circuits further including select switching means for enabling selection of a given trunk circuit, said common control means including output means for providing a plurality of output control points including a separate group of output control points for each group of trunk circuits, highway control means connected to certain ones of said output control points of one of said groups for activating at least one trunk circuit control highway to provide control signals for operating the control switching means for the corresponding group of trunk circuits, the select switching means of said one group of trunk circuits being individually connected to further output control points of said one group for selective operation to connect the associated control switching means to said trunk circuit control highway to receive said control signals.

5. A system as set forth in claim 4 wherein said highway control means provides a first and a second trunk circuit control highway, and transfer means for setting one of said trunk circuit control highways to an active state and the other of said trunk circuit control highways to a standby state.

6. A system as set forth in claim 5 wherein said highway control means includes fault detecting means for monitoring the operation of said output means and for providing an indication to said common control means whenever a fault occurs in said output means, said transfer means including switching means enabled by said common control to set said one trunk circuit highway to a standby state and to set said other trunk circuit control highway to an active state.

7. A system as set forth in claim 5 which includes a separate highway control means for each group of trunk circuits for providing a first and a second trunk circuit control highway for each group of trunk circuits, said transfer means being operable to set said first trunk circuit control highway to an active state and said second trunk circuit control highway to a standby state.

8. A system as set forth in claim 7 wherein each of said highway control means includes fault detecting means, each individually operable to provide an indication to said common control whenever a fault occurs in an associated output control point, said transfer means including a plurality of switching means commonly enabled to said common control means to set the first trunk circuit control highway to a standby state and the second trunk control highway to an active state.

9. In a communication switching system including a switching network having a plurality of inlets and a plurality of outlets, a plurality of trunk circuits adapted to request the service of common control means for causing the establishment of paths through the switching network from the trunk circuits to predetermined outlets of said switching network, a trunk circuit control arrangement comprising means controlled by said common control means to activate a trunk control highway for providing different sets of control signals for said trunk circuits to enable said trunk to be set to different circuits to ones of a plurality of control states, and select means controlled by said common control to individually connect said trunk circuits to said trunk control highway to receive said control signals.

10. In a commmunication switching system including a switching network having a plurality of inlets and a plurality of outlets, a plurality of trunk circuits adapted to request the service of common control means for causing the establishment of paths through the switching network from the trunk circuits to predetermined outlets of said switching network, each of said trunk circuits including a plurality of control switching means selectively operable to establish a plurality of different control states for said trunk circuit, a trunk circuit control arrangement comprising means controlled by said common control means to activate a first and a second trunk circuit control highway to provide control signals for said trunk circuits selectively over separate path sets which are common to a group of said trunk circuits highway transfer means for setting one of said trunk control highways to an active state and the other of said trunk control highways to a standby state, each of the trunk circuits of said group having an associated select switching means operable when enabled to effect the connection of each of the control switching means of the associated trunk circuit to a different path of the active trunk control highway, the select switching means of the trunk circuits of said group being selectively enabled by said common control means to permit a selected trunk circuit to be connected to said active trunk control highway.

* * * * *

UNITED STATES PATENT OFFICE

CERTIFICATE OF CORRECTION

PATENT NO. : 3,909,542

DATED : Sept. 30, 1975

INVENTOR(S) : BRUCE R. WUNLUCK et al

It is certified that error appears in the above-identified patent and that said Letters Patent are hereby corrected as shown below:

Column 30, line 67, "a" should be -- at

Column 32, line 24, "to" (first occurrence) should be -- by --

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*